June 1, 1937. R. A. CHRISTIAN 2,082,098
CALCULATING MACHINE
Filed June 25, 1934 9 Sheets-Sheet 1
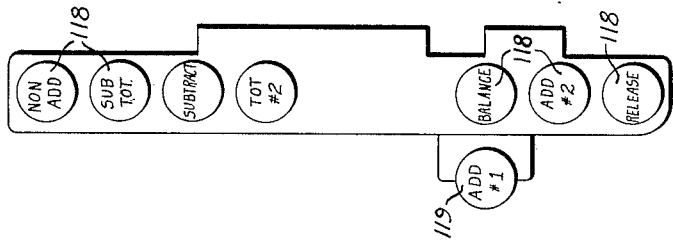
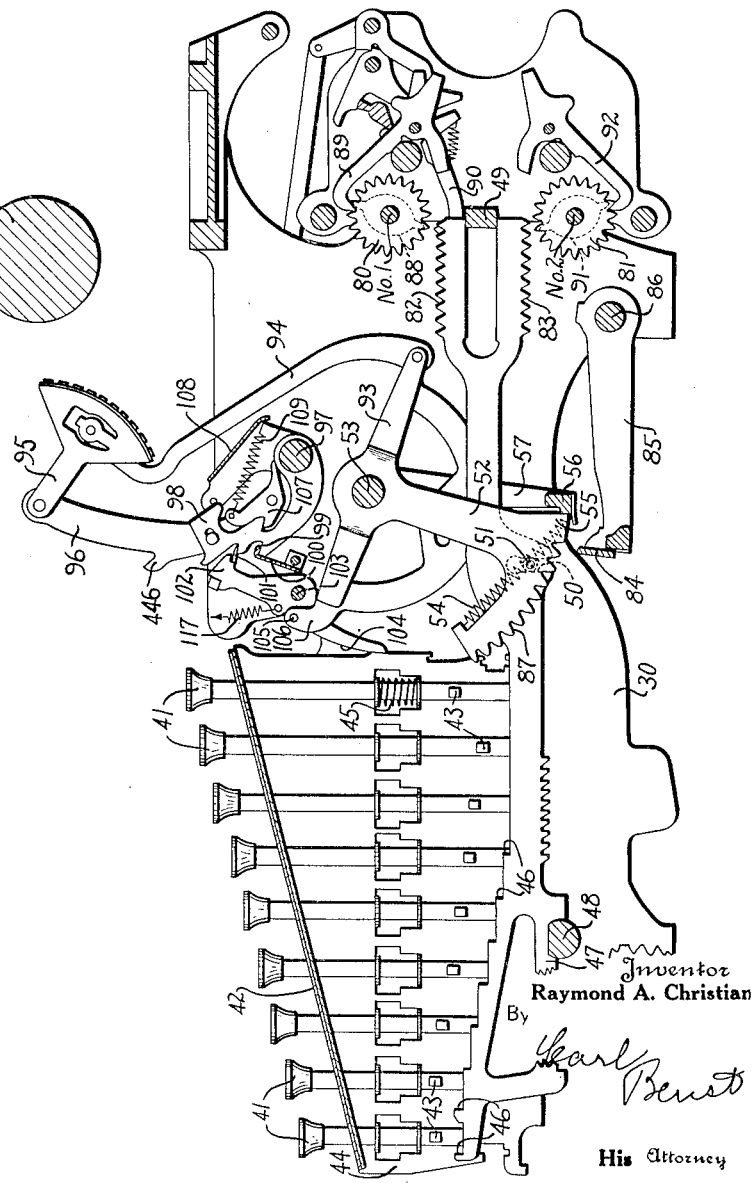
Inventor
Raymond A. Christian
By
Karl Benst
His Attorney

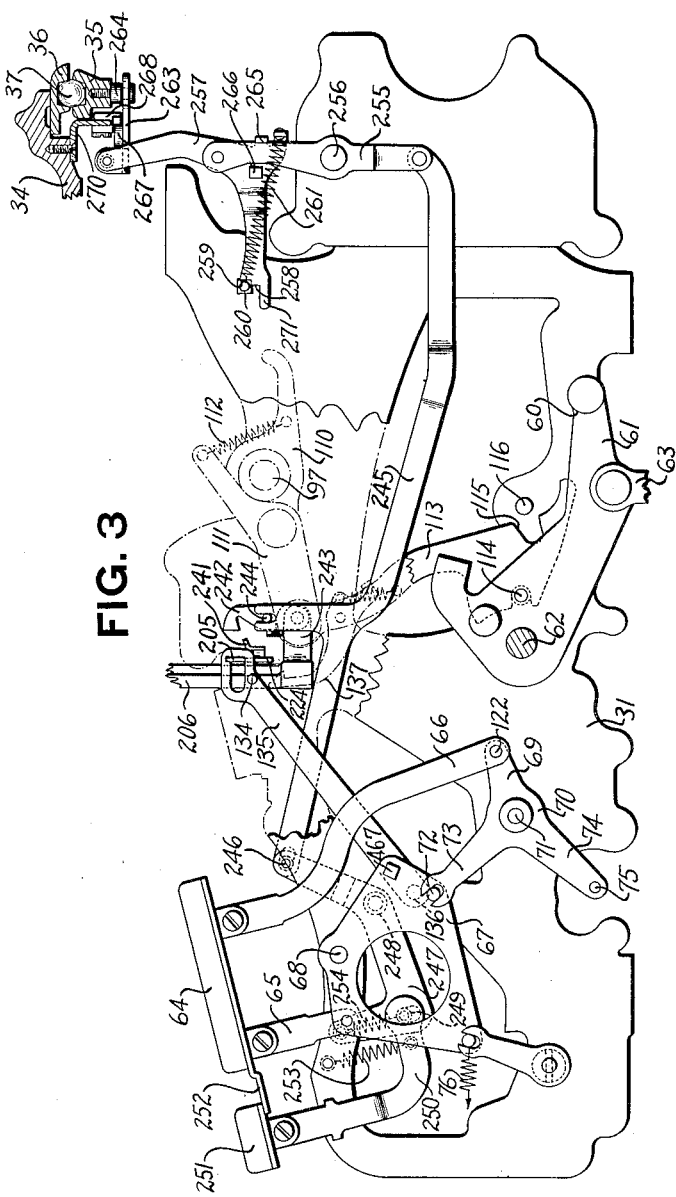

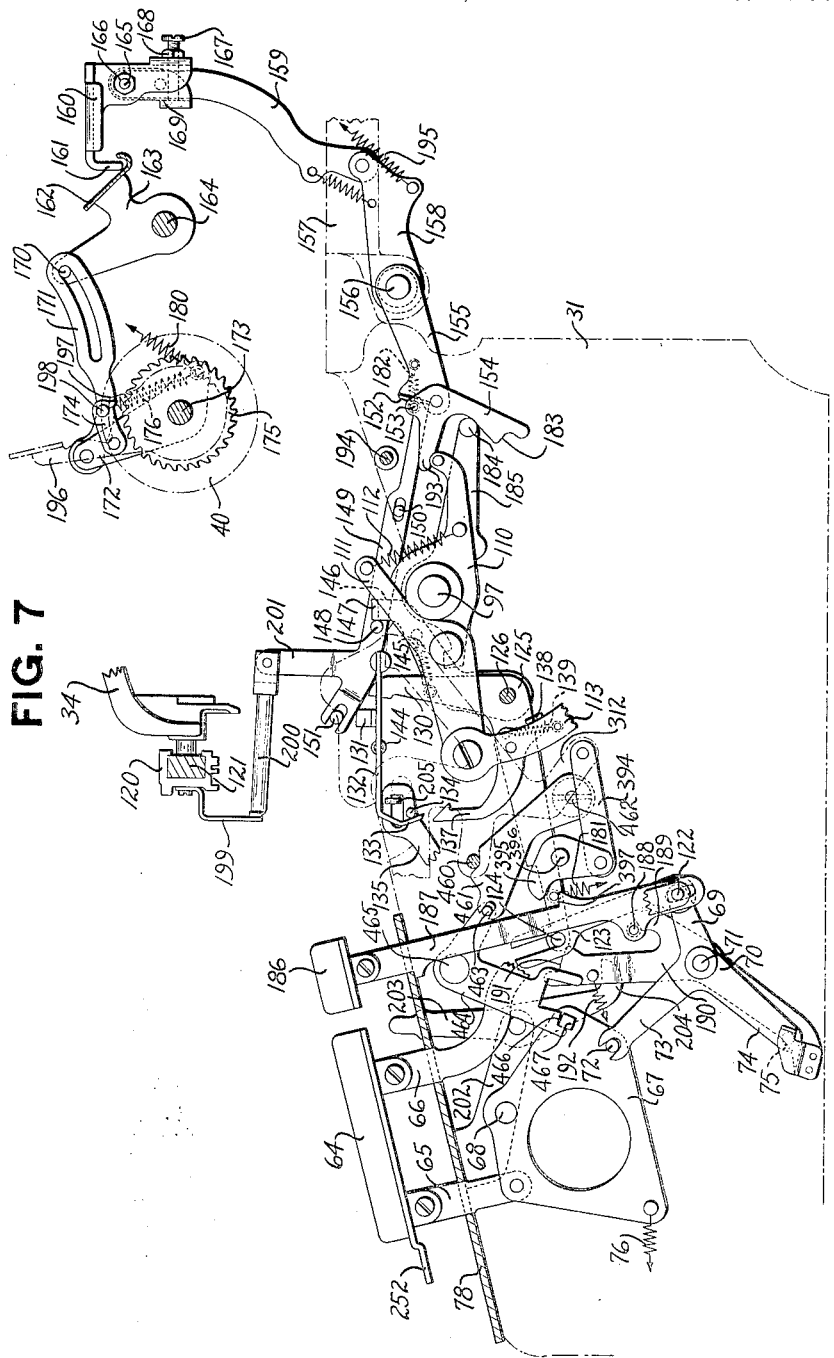

June 1, 1937.   R. A. CHRISTIAN   2,082,098
CALCULATING MACHINE
Filed June 25, 1934   9 Sheets-Sheet 4

Inventor
Raymond A. Christian
By
Kearl Beust
His Attorney

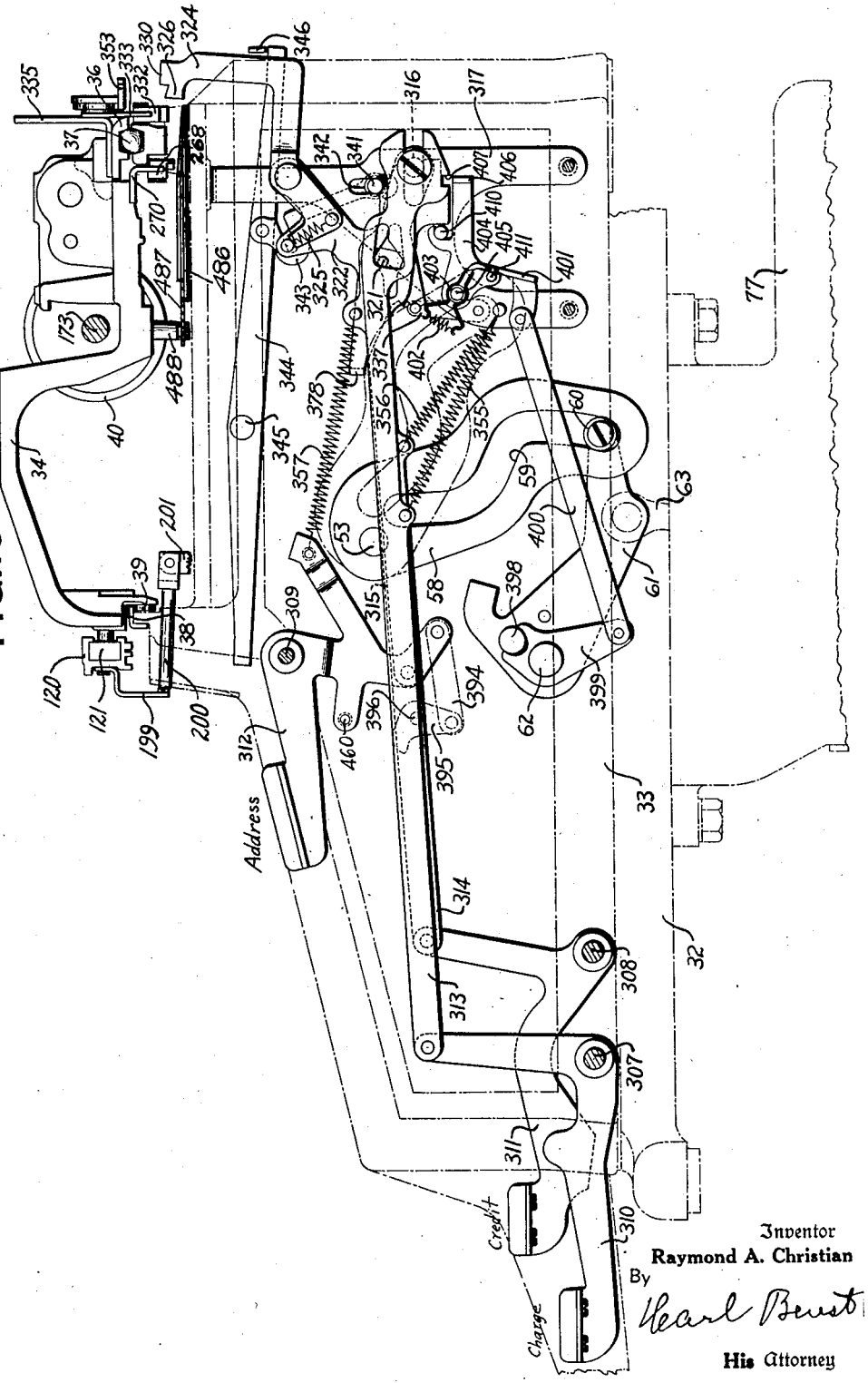

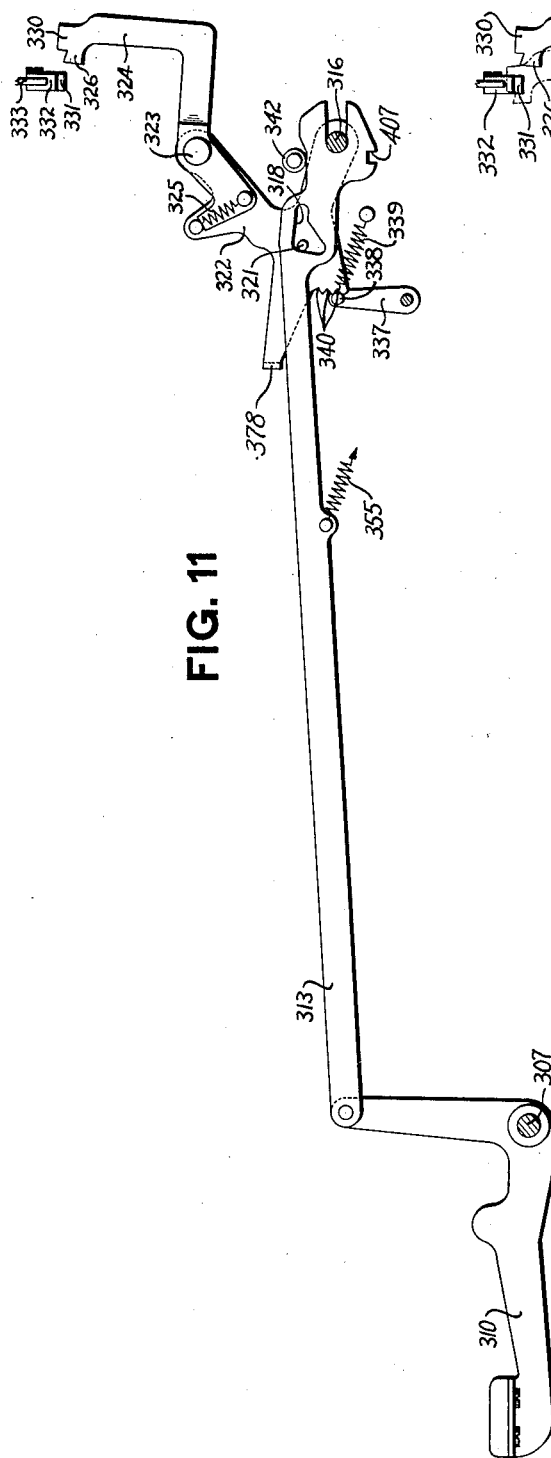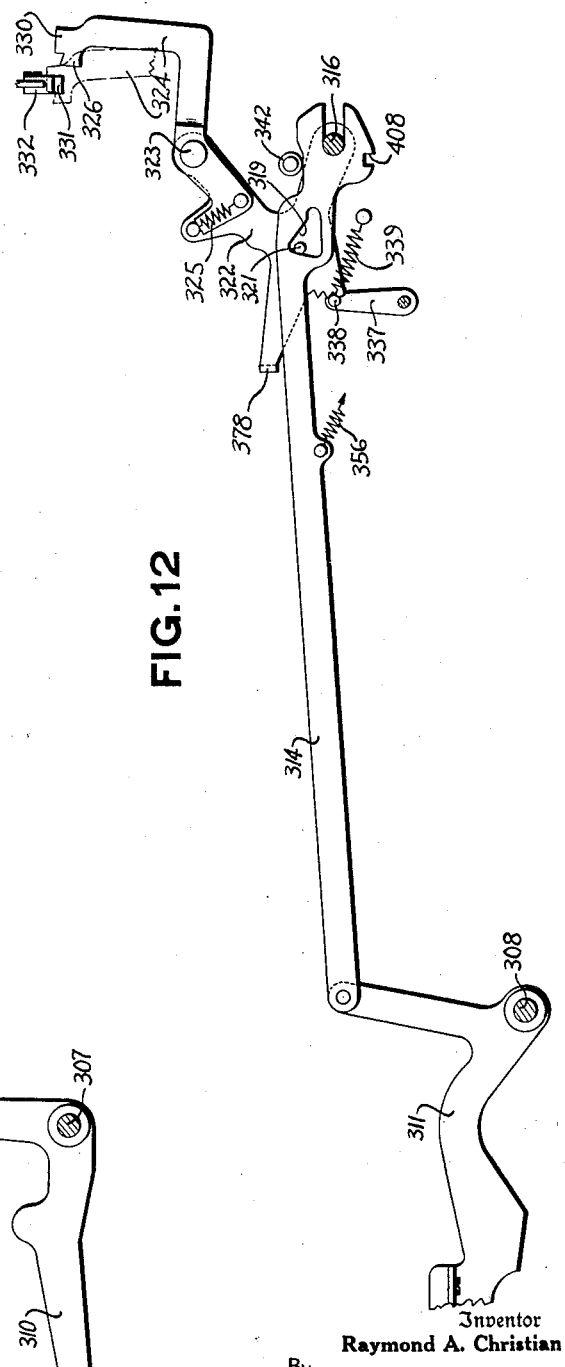

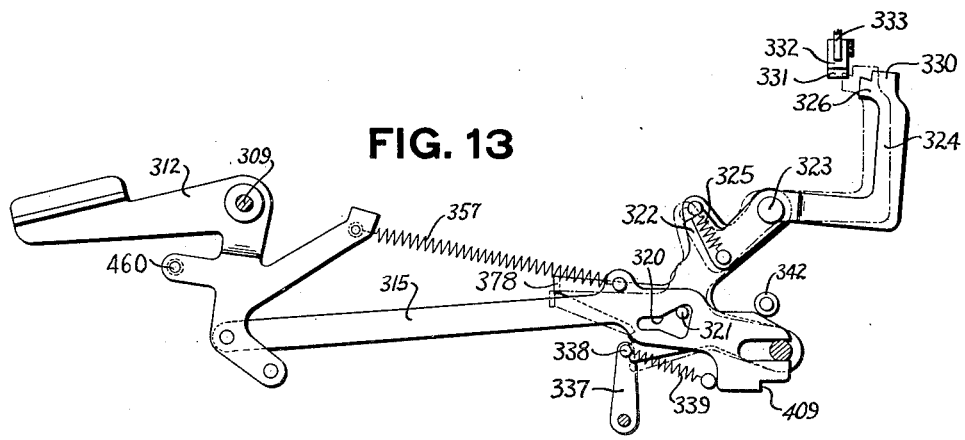
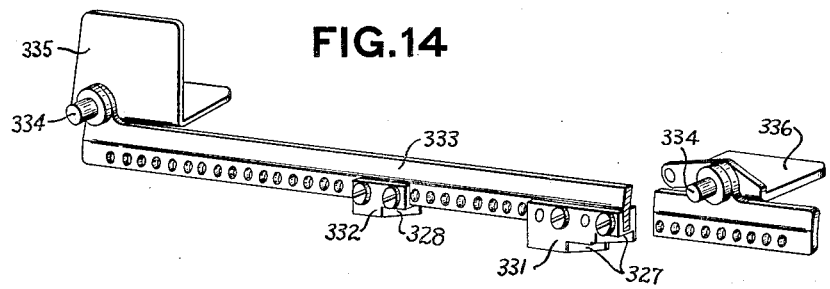
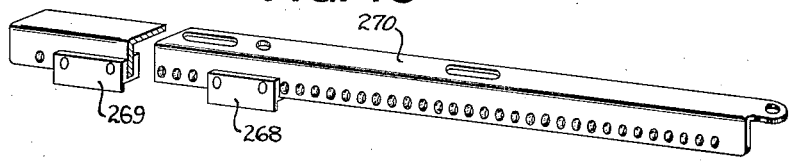
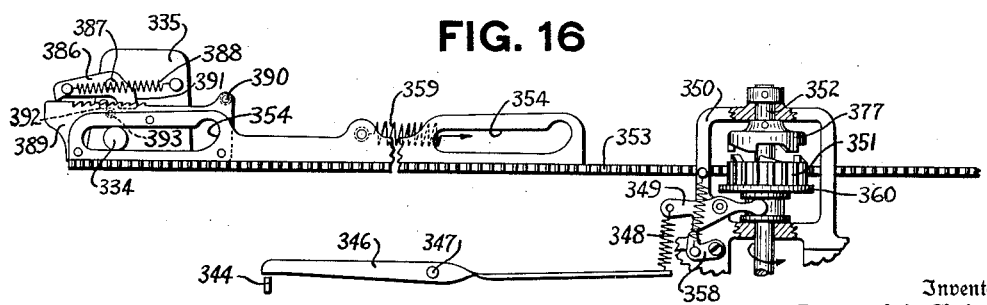
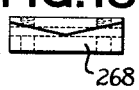

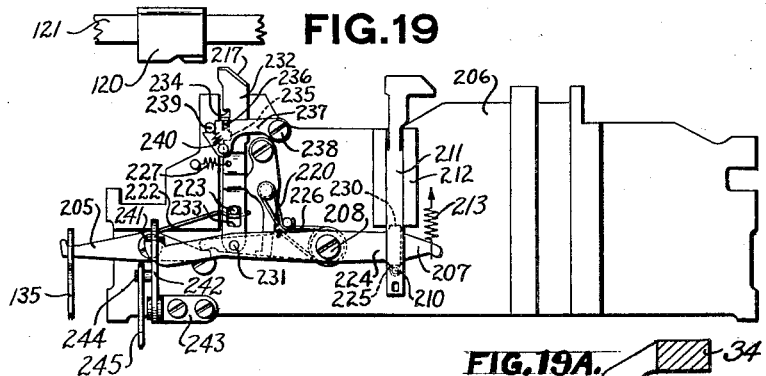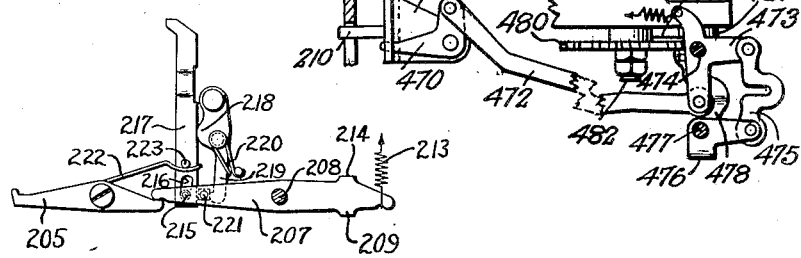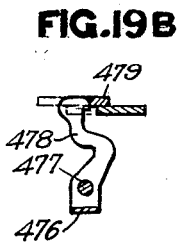

June 1, 1937.  R. A. CHRISTIAN  2,082,098
CALCULATING MACHINE
Filed June 25, 1934   9 Sheets-Sheet 9
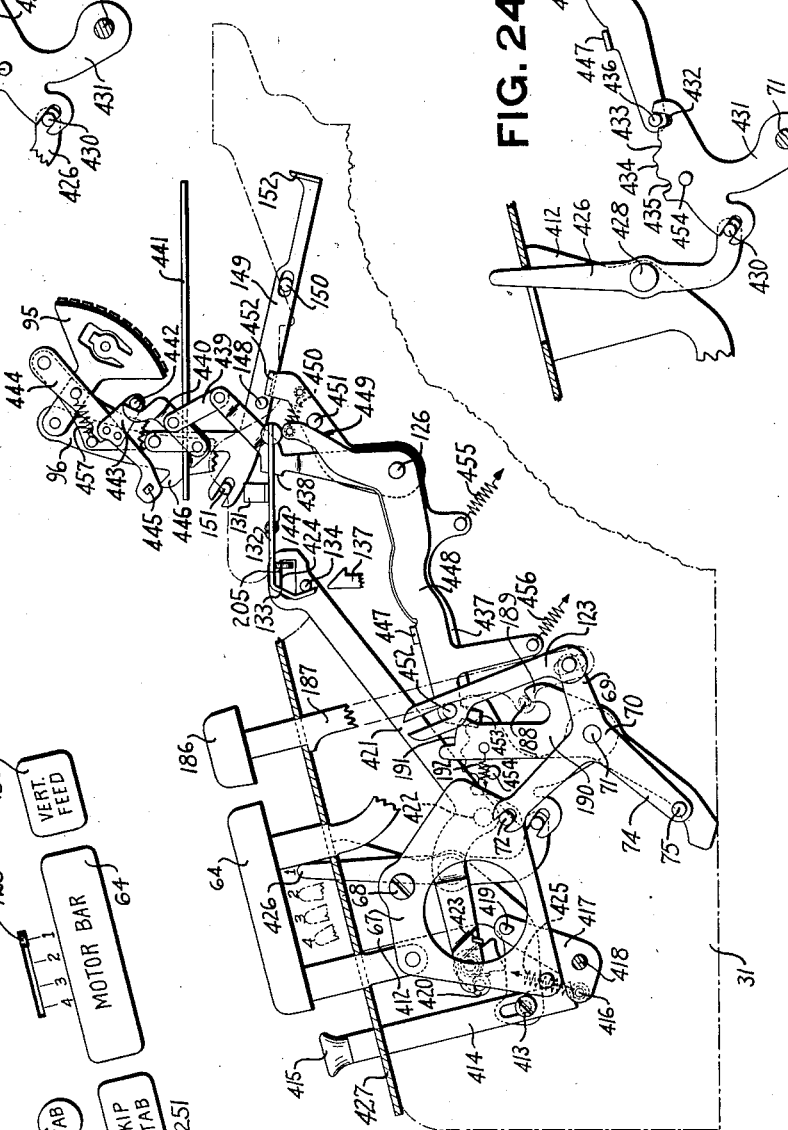
Inventor
Raymond A. Christian
By Earl Beust
His Attorney Patented June 1, 1937

2,082,098

UNITED STATES PATENT OFFICE 2,082,098

CALCULATING MACHINE

Raymond A. Christian, Dayton, Ohio, assignor to The National Cash Register Company, Dayton, Ohio, a corporation of Maryland Application June 25, 1934, Serial No. 732,252

52 Claims. (Cl. 197—66)

This invention relates to improvements in accounting machines of the type illustrated and described in Letters Patent of the United States No. 1,203,863, issued November 7, 1916 to Halcolm Ellis and U. S. Patent No. 1,819,084 issued August 18, 1931 to Emil John Ens.

As disclosed in the instant invention, the Ellis type accounting machine is equipped with a traveling carriage and typewriter keyboard in addition to the regular adding machine keyboard. However the typewriter attachment is a matter of choice and may be omitted where the business system does not demand it.

In order to better adapt the Ellis machine for use by large department stores, banks, public utility companies and the like, who issue periodical statements to a plurality of customers certain novel improvements were provided, particularly in the traveling carrier and platen controlling mechanisms.

Therefore, it is broadly an object of this invention to incorporate in a machine of the type referred to various improvements to increase its utility and flexibility so that it may be easily adapted for use in the majority of modern business concerns.

A more specific object is to provide novel means for selectively controlling the traveling carriage and platen mechanisms of accounting machines.

Another object is to provide means to return the traveling carriage to certain predetermined positions and simultaneously release the machine for operation and initiate the platen feed.

Still another object is to provide means to lock the selective controlling and traveling carriage returning means during a part of machine operation.

A further object is to contrive means to skip-tabulate the traveling carriage.

A still further object is to supply adjustable stops for use in connection with the selective controlling means and the skip-tabulating means.

Another object of this invention is to provide means to release the machine for operation by depressing certain control keys.

Still another object is to contrive means whereby the traveling carriage in tabulated positions controls depression of certain control keys.

Other objects of the instant invention are: to devise means to control the mechanism that feeds the platen upon return of the traveling carriage to starting position; to contrive means to selectively control the platen feeding the printing, the tabulating and the machine releasing mechanisms, and to provide means to effectuate the platen feeding mechanism by means of the traveling carriage in tabulated positions thereof.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

Of said drawings:

Fig. 1 is a cross sectional view of the machine proper taken just to the right of a row of amount keys.

Fig. 2 is a plan view of the machine control keys.

Fig. 3 is an elevation as viewed from the right side of the machine, depicting in particular the skip-tabulating mechanism and the machine releasing mechanism.

Fig. 4 is a detail view of the mechanism for feeding the platen roll upon return of the traveling carriage to starting position.

Fig. 5 is a detail view of the platen roll feeding arm.

Fig. 6 is a top plan view, partially sectioned, of the "on" and "off" mechanism for the platen roll feeding mechanism.

Fig. 7 is a side elevation as observed from the right, illustrating the vertical feeding mechanism for the platen roll and the automatic tabulating mechanism.

Fig. 8 is a perspective view picturing the mechanism for releasing the machine for operation by means of the balance key and the mechanism for controlling depression of the balance key by means of the traveling carriage.

Fig. 9 is a detail view of the balance key and associated mechanism.

Fig. 10 is a side elevation as observed from the right of the machine depicting the mechanism that selectively controls the return of the traveling carriage.

Fig. 11 is a detail view of one of the selective return bars and its associated mechanism.

Fig. 12 is a detail view of another selective return bar and associated mechanism.

Fig. 13 is a detail view of still another traveling carriage return bar and the mechanism it controls.

Fig. 14 is a fragmentary perspective view as observed from the rear of the machine, depicting the selective return stop bar for the traveling carriage and the method of adjustably mounting the return stops thereon.

Fig. 15 is a fragmentary perspective view as observed from the rear of the machine picturing the skip-tabulating stop bar and the method of adjustably mounting skip-tabulating stops on said bar.

Fig. 16 is a fragmentary view as observed from the rear of the machine depicting the carriage return mechanism and the full stroke device for said mechanism.

Fig. 17 is a detail view of one type of skip-tabulating stop.

Fig. 18 is a detail view of another type of skip-tabulating stop.

Fig. 19 is an assembled view as observed from the rear of the machine depicting a portion of the traveling carriage tabulating mechanism.

Fig. 19—A is an elevation depicting the escapement mechanism that controls the tabulating movement of the traveling carriage.

Fig. 19—B is a sectional view through a part of the mechanism of Figure 19—A.

Fig. 20 is a detail view of a part of the mechanism of Fig. 19.

Fig. 21 is a facsimile of a fragment of one type of statement slip used in the machine of the instant invention.

Fig. 22 is a side elevation of a modified form of automatic tabulating mechanism.

Fig. 23 is a plan view of the machine and carriage control bars.

Fig. 24 is a detail view depicting the tabulating control plate and one of its associated levers.

Fig. 25 is a detail view illustrating the tabulating control plate and a fragment of another associated lever.

In the figures showing the frame work in phantom by dot and dash lines, where the dot and dash lines do not show behind the parts it indicates that such parts are in front of the frames, but where the dot and dash lines are shown crossing the full line parts it indicates that such parts are behind the frames.

General description

An accounting machine to be successfully used in present-day businesses must not only be rugged and free from mechanical defects but the success of such a machine depends largely upon such vital factors as accuracy, speed and ease of operation. In accomplishing these results, various improvements have been made in the traveling carriage, platen roll, and machine controlling mechanisms, and it is to these improvements that the present invention is directed.

In its present embodiment the instant machine is shown adapted for use by large department stores where charge accounts of a great number of individuals are carried from month to month. However, it is not desired to limit the machine of this invention to the particular use cited above as the previously mentioned improvements widen the scope and increase the flexibility of the machine to the extent that it may easily be adapted for use in most any business where it is necessary to frequently balance individual accounts and to make out statement slips or bills to be sent to a plurality of individual customers or patrons.

In the machine of the present invention three touch bars have been provided for returning the traveling carriage to different columnar positions. These touch bars control mechanism that cooperates with a plurality of stops adjustably mounted at the rear of the traveling carriage in the desired columnar positions. In conventional machines it is customary to tabulate the traveling carriage from an extreme right hand position in successive steps toward the left after which the traveling carriage is again returned to starting position. However, in the instant machine, in addition to the customary tabulation from right to left it is also possible by means of the mechanism outlined above to return the traveling carriage from tabulated positions to predetermined columnar positions.

In order to prevent the operator from depressing one of the carriage return touch bars before printing is complete, mechanism is provided for locking said touch bars against depression until after the impression is made.

In addition to returning the traveling carriage to a predetermined columnar position the return bar illustrated in Fig. 13 also depresses the vertical feed bar to cause the platen roll to be line-spaced.

The instant machine is equipped with a skip-tabulating touch bar, depression of which releases the machine for operation and simultaneously locks the tabulating stop bars against movement into the path of the tabulating stops located at the front of the traveling carriage. Other stops located at the back of the traveling carriage unlock the tabulating stop bars allowing them to move upwardly into the path of the proper tabulating stop after the traveling carriage skip-tabulates to the desired columnar position.

The skip tabulating mechanism is so arranged that when the skip tabulating touch bar is depressed and the weight of the hand immediately removed therefrom the tabulating stop bars will be unlocked by a certain type of stop located at the rear of the traveling carriage, and when the weight of the hand is allowed to remain on the skip tabulating touch bar the first mentioned stops have no effect but the traveling carriage continues to skip tabulate until another type of stop unlocks the tabulating stop bars.

In the instant machine depressing the regular starting bar causes the traveling carriage to be tabulated from one column to the next without imparting any feeding movement to the platen roll. However, an auxiliary starting bar known as the vertical feed starting bar has been incorporated in the instant machine, which when depressed prevents tabulation of the traveling carriage and causes the platen roll to be rotated to line-space the record material wound therearound. Stops located on the traveling carriage, cooperating with the above mechanism, cause the platen roll to be line-spaced when the regular motor bar is used to release the machine for operation.

The balance key of the instant machine in addition to conditioning the balance totalizer for clearing operations also by means of mechanism shown in Fig. 7 releases the machine for operation by depressing the regular starting bar. A novel non-repeat mechanism prevents repetition of operation when the balance key is inadvertently retained depressed. In order to prevent the balance key being depressed before the traveling carriage has had time to tabulate to the "balance" column, mechanism has been provided to lock the balance key against depression until the "balance" column is alined with the printing mechanism. A stop on the traveling carriage cooperating with a hanging bar lever then unlocks the balance key.

The mechanism briefly outlined above, and other mechanism of the machine pertinent to the instant invention will now be described in detail.

Detailed description

The mechanism of the machine of the present invention is supported between a left side frame 30 and a right side frame 31 (Figs. 1, 8 and 10), in turn secured to a machine base 32. Enclosing the mechanism of the machine is a case 33, which is also secured to the base 32. The back of a traveling carriage 34 is supported for horizontal movement on the case 33 by means of a lower ball race 35 secured to the case 33 and an upper ball race 36 secured to the frame of the traveling carriage and a plurality of ball bearings 37 interposed between the two races. The front of the traveling carriage 34 is supported by means of rollers which bear on the top surface of a guide rail 38 secured to the case 33. The traveling carriage is prevented from tipping up in front by means for rollers 39 cooperating with the bottom surface of the rail 38. After the traveling carriage 34 has been properly assembled on the machine case 33 a plurality of brackets not shown, are secured to said traveling carriage and cooperate with an undercut portion of the race 35 to retain the traveling carriage in place on the case 33.

The traveling carriage 34 (Fig. 10) carries a platen roll 40 which swings upwardly away from printing position so that record material may be inserted in the front thereof and pushed around the platen roll until the proper line thereof is in printing position. For a full disclosure of the front feed platen mechanism see co-pending application of Raymond A. Christian, Serial Number 653,838, filed January 27, 1933.

Machine keyboard and operating mechanism

The machine of this invention has a plurality of denominational rows of amount keys 41, one of such denomination rows being illustrated in Fig. 1. The amount keys 41 are depressibly mounted by means of a top keyboard plate 42 having therein slots adapted to loosely support the upper end of said amount keys and by means of studs 43 secured in the lower ends of said amount keys cooperating with vertical slots in one of the keyboard side plates 44. The amount keys 41 are flexible in that after one key has been depressed in a particular row depressing another key in that same row releases the first key depressed and so on. Each amount key 41 has a spring 45 adapted to return and retain said amount keys in their upward positions upon release thereof.

Depression of one of the amount keys 41 moves the stud 43 carried thereby into the path of one of a series of graduated steps 46 on an amount rack 47 mounted for horizontal reciprocating movement by means of a rod 48 and a bar 49 supported by the main frames 30 and 31. The amount rack 47 has therein a vertical slot 50 which embraces a stud 51, secured in a segment 52 loose on a leading frame shaft 53, opposite ends of which are journaled in the frames 30 and 31. A spring 54 urges a projection 55 of the segment 52 into contact with the forward edge of a leading frame bail 56 extending between a pair of arms 57 secured on the shaft 53.

Secured on the right hand end of the shaft 53 (Fig. 10) is a plate 58 having therein a cam slot 59 adapted to cooperate with a roller 60 carried by an arm 61 secured on a main drive shaft 62, journaled in the frames 30 and 31. The arm 61 has pivoted thereto the upper end of a link 63 (Fig. 3) the lower end of which is pivoted to the driven member of a motor clutch (not shown). The driving member of the motor clutch is geared to the usual constantly running electric motor 77 which is secured beneath the base 32.

Located on the right hand side of the keyboard is the usual starting bar 64 (Figs. 3 and 7) having stems 65 and 66 which extend through openings in an auxiliary keyboard plate 78 and are pivoted respectively to a plate 67 pivoted on a stud 68 secured in the frame 31, and an extension 69 of a lever 70 loose on a stud 71 also carried by the frame 31. The plate 67 carries a stud 72 which cooperates with the bifurcated end of an extension 73 of the lever 70. Another extension 74 of the lever 70 carries a stud 75 which cooperates with the clutch release mechanism in the well known manner as shown and described in the patent of the United States No. 1,601,102 issued to F. W. Bernau on September 28, 1926.

Depressing the starting bar 64 (Fig. 3) rocks the plate 67 counter-clockwise against the tension of a spring 76, which in cooperation with the stem 66 of said starting bar rocks the lever 70 in a clockwise direction to move the stud 75 out of the path of the clutch releasing mechanism. This connects the clutch driven member to the driving member in the well known manner thereby causing both members to be revolved in unison by the motor. After the clutch driven member completes one revolution of movement it is automatically declutched from the clutch driving member and the starting bar 64 is simultaneously restored upwardly to normal position. Revolution of the clutch driven member as explained above by means of the link 63 rocks the arm 61 and the shaft 62 first counter-clockwise and then back to normal position through an approximate angle of sixty degrees. This by means of the roller 60 (Fig. 10) in cooperation with the cam slot 59 rocks the plate 58 and the shaft 53 first in a clockwise direction and then back to normal position. Maximum counter-clockwise movement of the plate 58 is indicated by the dot and dash outline of said plate in Fig. 10.

By referring to Fig. 1 it is obvious that any movement of the shaft 53 is transmitted by means of the arms 57 to the bail 56 of the leading frame. Initial movement counter-clockwise of the bail 56 by means of the spring 54 causes the segment 52 to move in unison therewith which by means of the stud 51 and the slot 50 causes the amount rack 47 to move rearwardly until one of the graduated steps 46 engages the stud 43 of the depressed amount key 41. This prevents further rearward movement of the amount rack 47 and the segment 52, consequently the bail 56 completes its rearward movement independently thereof flexing the spring 54. In its return movement clockwise the bail 56 picks up the segment 52 and returns said segment and the amount rack 47 to their normal or zero positions. In case no amount key is depressed the zero stop lever retains the rack 47 in its zero position, as shown in Fig. 1 during machine operations.

The amount keys 41 position the rack 47 in the manner just described in adding and subtracting operations. In totalizing operations the proper denominational wheel of the selected totalizer positions the rack 47 commensurate with the amount on said totalizer wheel in a manner presently to be described.

Totalizers

In its present embodiment the machine of the instant invention is equipped with two totalizers, an upper add-subtract or No. 1 totalizer and a lower adding or No. 2 totalizer (Fig. 1), however it is merely a matter of assembly to equip the instant machine with additional totalizers. The No. 1 and No. 2 totalizers have respectively a plurality of wheels 80 and 81, only one of each here shown, adapted to be rocked into mesh with teeth 82 and 83 of the amount rack 47 in the usual manner.

In adding operations after the rack 47 has completed its initial movement rearwardly and has been properly positioned by one of the amount keys 41, as explained above, an alining bar 84 connected by a pair of arms 85 to a shaft 86 is rocked into engagement with teeth 87 of the segment 52 to retain said segment and the amount rack 47 in their set position. Following this the corresponding wheel of the selected totalizer or totalizers is rocked into mesh with said rack, return movement forwardly of which rotates the wheel commensurate with the value of the depressed amount key.

In subtracting operations the corresponding wheel of the No. 1 or balance totalizer is rocked into engagement with the teeth 82 of the rack 47 before said rack starts its initial movement rearwardly. Initial movement rearwardly of the rack 47 revolves the wheel 80 of the No. 1 or balance totalizer in a reverse or counter-clockwise direction until said rack 47 is stopped by the depressed amount key, as explained earlier herein. After the leading frame bail 56 and the rack 47 complete their initial movement rearwardly the wheel of the balance totalizer is disengaged from said rack 47. This results in the value of the depressed amount key being subtracted from the balance totalizer.

The wheels 80 (Fig. 1) of the No. 1 totalizer each carry a tripping plate 88 with diametrically opposed tripping teeth which cooperate with add transfer pawls 89 and subtract transfer pawls 90 to transfer amounts from lower to higher denominations and to position the racks 47 in totalizing operations in a manner presently to be described. In adding operations the add transfer pawls 89 are rocked into the path of the teeth of the tripping plates 88 and the subtract pawls 90 are simultaneously rocked out of the path of the teeth of said tripping plates. In subtracting operations the subtract transfer pawls 90 are moved into the path of the teeth of the tripping plate 88 and the add transfer pawls 89 are moved out of the path of said teeth.

Referring to Fig. 1, which as previously stated depicts the mechanism for one denominational unit, in adding operations when either of the teeth of the tripping plate 88 wipes past the tripping point of the adding transfer pawl 89 the transfer mechanism for the next higher denomination is tripped, thus causing one to be added in said next higher denomination. In subtract operations when one of the teeth of the tripping plate 88 wipes past the subtract transfer pawl 90 the transfer mechanism for the next higher denomination is tripped, thus causing one to be subtracted from said higher denomination.

In totalizing operations the wheel 80 is engaged with the rack 47 prior to its initial movement rearwardly, which movement rotates said wheel 80 in a reverse or counter-clockwise direction until one of the teeth of the tripping plate 88 engages the inner surface of the tripping point of the add transfer pawl 89. This arrests the movement of the wheel 80 and positions the rack 47 and the segment 52 commensurate with the amount on said wheel 80. The wheel 80 is now in zero position and if the operation is a clearing or resetting operation it is disengaged from the amount rack 47 before said rack starts its return movement forwardly. In reading or subtotalizing operations the wheel 80 remains in engagement with the rack 47 during its return movement forwardly, consequently the amount is replaced thereon.

Each of the wheels 81 of the No. 2 totalizer carries a transfer tripping plate 91 similar to the plates 88 for the No. 1 totalizer wheels and having diametrically opposed teeth which cooperate with the tripping point of the No. 2 add transfer pawls 92 in adding and totalizing operations in exactly the same manner as described for the No. 1 totalizer.

Printing mechanism

The printing mechanism will now be explained in connection with the mechanism shown in Fig. 1 for a particular denomination of the machine.

The segment 52 has an arm 93 pivotally connected by a link 94 to a type segment 95 pivoted on an arm 96 loose on a printer shaft 97 journaled in the right machine frame 31 and in the printer frames (not shown). The arm 96 carries a plate 98 with a projection 99 which cooperates with a printer release trigger 100, rotatably supported by the printer frame. The plate 98 has another projection 101 which cooperates with a zero elimination hook 102 loose on a shaft 103 supported by the printer frame. The hook 102 has a downward extension with an arcuate surface 104 which cooperates with a stud 105 carried by an extension 106 of the segment 52. Tensioned between a pawl 107 carried by the arm 96 and the bail of a yoke 108 secured on the shaft 97 is a spring 109 which actuates the printing segment 95 and the arm 96 in a manner presently to be described.

Directing attention to Figs. 3 and 7 the printer shaft 97 has secured on the right hand end thereof an arm 110 pivotally supporting an arm 111, flexibly connected thereto by means of a spring 112. The arm 111 has pivoted thereto the upper end of a link 113 having in its lower end a slot which normally engages a stud 114 carried by the main drive arm 61.

In adding, subtracting and totalizing operations, which require a single cycle of movement of the arm 61 and the shaft 62 the link 113 remains operatively engaged with the stud 114 to oscillate the printer shaft 97 first in a clockwise direction and then back to normal position, as shown in Fig. 3. In the beginning of an overdraft operation which requires three cycles of movement of the arm 61 and the shaft 62, the link 113 is disconnected from the stud 114 during the first two cycles of such overdraft operation and reconnected therewith during the last cycle of operation. This prevents unnecessary operation of the printer mechanism. When the link 113 is disconnected from the stud 114 a notch 115 in the rear edge thereof engages a stud 116 in the right frame 31 to secure the printer mechanism against movement.

In adding, subtracting and totalizing operations initial movement rearwardly of the segment 52 (Fig. 1) and the amount rack 47 under influence of the leading frame bail 56 by means of the link 94 positions the printing segment 95 commensurate with the position of the amount rack 47. When the bail 56 reaches the terminus of its rearward movement it dwells slightly in this position and during this dwell clockwise movement of the shaft 97 and the yoke 108 rocks the release trigger 100 counter-clockwise to release the arm 96 and the printing segment 95 to the action of the spring 109 which has been given added tension by clockwise movement of the bail 108. The spring 109 urges the arm 96 and the segment 95 clockwise, causing said segment to make an impression upon material wound around the platen roll 40. Return movement counter-clockwise of the shaft 97 and the bail 108 restores the arm 96 and the printing segment 95 to the position shown in Fig. 1.

Whenever the segment 52 moves out of zero position the stud 105 in cooperation with the arcuate surface 104 of the zero elimination hook 102 rocks said hook a slight distance counter-clockwise to disengage it from the projection 101 of the plate 98 thereby allowing the printing mechanism for that denomination to function. This counter-clockwise movement of the zero elimination hook 102 is imparted to the zero elimination hook of the next lower denomination when its segment 52 is retained in zero position. This allows the zeros of the lower order denominations to print and prevents the zeros of the higher order denominations from printing. When the segment 52 is returned to zero position, as shown in Fig. 1, a spring 117 restores the zero elimination hook 102 clockwise so that it engages the projection 101 of the plate 98.

Directing attention to Fig. 2, a row of control keys 118 and a No. 1 add key 119 located on the left hand side of the keyboard control the functions of the totalizers. The functions of the totalizers are also controlled by means of stops 120 (Fig. 7) in cooperation with the usual hanging bar levers. The stops 120 are adjustably supported in predetermined columnar positions by a stop bar 121 secured to the front of the traveling carriage 34.

*Traveling carriage mechanism*

As previously brought out, the machine of this invention is provided with a traveling carriage similar to that used on typewriters. The traveling carriage is adapted to be tabulated from column to column, and means are also provided to skip-tabulate the traveling carriage through one or more columnar positions at a time. Selectively controlled mechanism is provided to automatically return the traveling carriage from any tabulated position to an extreme right hand or starting position, or to other predetermined columnar positions. Mechanism is also provided to simultaneously effectuate the automatic platen feeding mechanism, the machine releasing mechanism, and the selective carriage returning mechanism simultaneously. Depression of the balance key is also controlled by columnar positions of the traveling carriage, and in addition means are provided whereby depression of the balance key releases the machine for operation. The traveling carriage mechanism will now be described in detail.

*Traveling carriage tabulating and platen roll feeding mechanisms*

Referring to Figs. 3 and 7, the extension 69 of the lever 70 has therein a stud 122 which loosely supports the lower end of the stem 66 of the machine starting bar 64 and also pivotally supports a link 123 bifurcated to embrace a stud 124 in a lever 125 loose on a stud 126 fast in the frame 31. An upward extension 130 of the lever 125 cooperates with a right-angled projection 131 of a tabulating control bar 132 loosely supported by a slotted stud secured in the frame 31. The bar 132 has a downward extension 133 adapted to shield a stud 134 secured in a tabulating lever 135 pivoted on a stud 136 secured in the right frame 31. Pivoted on the link 113 (Fig. 7) is a hook 137 which cooperates with the stud 134 and has a projection 138 which is urged clockwise into engagement with the edge of the link 113 by a spring 139.

It will be recalled that during operation of the machine the link 113 moves upwardly and then back to normal position to operate the printer shaft 97. A spring 144 is tensioned to urge the bar 132 toward the left to normally maintain the extension 133 thereof in position to shield the stud 134 from the hook 137. With the parts in the positions shown in Fig. 7, when the link 113 moves up and down during machine operations, the hook 137 rides idly over the extension 133 and is thereby prevented from engaging the stud 134.

Loose on the stud 126 and flexibly connected to the lever 125 by a spring 145 is an arm 146, a right-angled projection 147 of which is adapted to coact with a stud 148 in a bar 149 slidably supported upon studs 150 and 151 secured in the right printer frame. A hook 152 of the bar 149 cooperates with a stud 153 in a pawl 154 loose on an arm 155 secured on a shaft 156 journaled in downwardly extending ears of a cross frame 157 extending between the frames 30 and 31. Another arm 158 secured on the shaft 156 has pivoted thereto a link 159 adjustably supporting a paper feed hook 160 with a downward projection 161 which cooperates with the rolled edge of a feed bail 162 supported by a plurality of arms 163 secured on a shaft 164 journaled in the traveling carriage frame. The hook 160 is pivoted on a screw stud 165 carried by the link 159 and is secured against movement by means of a nut 166 threaded on said screw. The projection 161 may be adjusted in relation to the rolled lower edge of the bail 162 by means of a screw 167 threaded in a projecting ear of the hook 160 and secured against movement by means of a lock nut 168. The end of the screw 167 cooperates with a right-angled projection of a plate 169 secured to the link 159.

Secured in the left hand arm 163 in a stud 170 extending through a slot in a link 171 pivoted on an arm 172 loose on a shaft 173 which carries the platen roll 40 and which is rotatably supported by the traveling carriage frame. Turnably supported by the arm 172 is a feed pawl 174 urged into engagement with the teeth of a ratchet 175 secured on the shaft 173 by a spring 176. A spring 180 urges the arm 172 counter-clockwise to return the pawl 174 to normal position after feeding takes place.

Depressing the starting bar 64 rocks the plate 67 counter-clockwise and the lever 70 clockwise to move the link 123 downwardly. This allows the lever 125 to be rocked counter-clockwise by a spring 181 causing the arm 130 of said lever to engage the extension 131 of the bar 132 to move the downward extension 133 thereof out of the path of the hook 137. The spring 145 transmits the counter-clockwise movement of the lever 125 to the arm 146 to move the bar 149 forwardly.

The hook 152 of said bar, in cooperation with the stud 153 rocks the pawl 154 counter-clockwise against the tension of a spring 182. This moves the lower notched end 183 of the pawl 154 out of the path of a stud 184 in an arm 185 secured on the shaft 97. Consequently during operation of the machine the arm 185 moves idly first clockwise and then back to normal position. During machine operation upward movement of the link 113 (Fig. 7) causes the hook 137 to latch over the unprotected stud 134 and after impression is complete downward movement of said link 113 causes the hook 137 to pull the lever 135 downwardly to tabulate the traveling carriage in a manner later to be described. When the lever 135 reaches the terminus of its downward movement the stud 133 moves out of the path of the hook 137 which completes its downward movement independently thereof.

Near the end of machine operation the starting bar 64, the plate 67 and the levers 70 and 125 are restored to normal positions, as shown in Fig. 7. The spring 144 then returns the bar 132 toward the left so that the extension 133 again protects the stud 134 from the hook 137 and the spring 182 returns the bar 149 and the pawl 154 so that the notched end of said pawl is again in the path of the stud 184 in the arm 185.

A vertical feed bar 186 has a stem 187 which extends through an opening in the auxiliary keyboard plate 78 and is slotted at its lower end to embrace the stud 122 in the arm 69 of the lever 70. The stem 187 carries a stud 188 which cooperates with a projection 189 of an arm 190 loose on the stud 71 and having an arcuate surface 191 arranged to move under the stud 124 to block the counter-clockwise movement of the lever 125. A spring 192 urges the arm 190 counter-clockwise which by means of the projection 189 in cooperation with the stud 188 normally maintains the bar 186 upwardly in the position here shown.

When the vertical starting bar 186 is depressed the stud 188 in cooperation with the projection 189 rocks the arm 190 clockwise, causing the arcuate surface 191 to pass under the stud 124 to block movement of the lever 125. After this the vertical bar stem 187 in cooperation with the stud 122 rocks the lever 70 clockwise to release the machine for operation in the usual manner. Obviously the arm 146 imparts no movement to the bar 149 consequently the notched end 183 of the pawl 154 remains in the path of the stud 184 in the arm 185 and when the shaft 97 and the arm 185 receive their initial clockwise movement the stud 184 wipes by the notched lower end of the pawl 154. When the shaft 97 and the arm 185 are being returned counter-clockwise the stud 184 engages the notched end of the pawl 154 to rock the arm 155 the shaft 156 and arm 158 clockwise. This moves the link 159 and the hook 160 downwardly, causing the projection 161 to engage the curled lower edge of the bail 162 to rock the arm 163 clockwise which by means of the link 171 rocks the arm 172 also clockwise. This causes the pawl 174 to engage the ratchet 175 to rotate the platen roll 40 clockwise to line-space record material wound there-around. When sufficient feeding movement has been imparted to the platen a tail 193 of the pawl 154 engages an eccentric 194 secured to the printer frame to disengage the notch 183 from the stud 184. A spring 195 then returns the arm 158, shaft 156 and associated parts to normal positions as here shown.

The usual means is provided for controlling the extent of feeding movement imparted to the platen roll 40. Loose on the shaft 173 (Fig. 7) is a lever 196 with a radial surface 197 which cooperates with a stud 198 in the feed pawl 174. When the spring 130 returns the arm 172 and associated parts to normal positions after feeding is completed the stud 198 rides upon the radial surface 197 to disengage the pawl 174 from the ratchet 175. By manipulating the lever 196 the moment of engagement of the pawl 174 with the ratchet 175 may be varied to control the feeding movement of the platen roll 40.

It is evident that when no movement is imparted to the lever 125 (Fig. 7) the bar 132 remains in its left hand position to cause the extension 133 thereof to protect the stud 134 from the hook 137. Therefore normally when the vertical feed bar 186 is used the traveling carriage remains stationary unless it is tabulated by hand in the well known manner or unless the bar 132 is moved to ineffective position by the usual manipulative means.

Still referring to Fig. 7, when the traveling carriage 34 is so positioned that an extension 199 of the stop 120 engages a plunger 200 free in a hole in the machine case 32 and loosely connected to an upward extension 201 of the bar 149 forward movement of said bar 149 and the arm 146 is blocked. Consequently when the machine is released by means of the bar 64 the lever 125 moves counter-clockwise independently of the arm 146 flexing the spring 145. This allows the pawl 154 to remain in position where the stud 184 will engage the notched lower end thereof to impart feeding movement to the platen roll 40, as explained earlier herein.

Secured to the auxiliary keyboard plate 78 is a bracket 202 which rotatably supports a lever 203 the upper end of which extends through a notched opening in said keyboard plate and the lower end thereof forming a hook 204 arranged to cooperate with the stud 124 in the lever 125. As here shown the lever 203 is in ineffective position. Moving the lever counter-clockwise to its effective position causes the hook 204 to engage the stud 124 to prevent counter-clockwise movement of the lever 125 irrespective of the downward movement of the link 123. Obviously this causes the vertical feed mechanism to function regardless of the use of the starting bar 64.

*Skip tabulating mechanism*

The machine of this invention is provided with novel mechanism which skip-tabulates the traveling carriage through a number of columnar positions to predetermined columnar positions. Depressing the skip tabulating bar releases the machine for operation and simultaneously latches the tabulating stop bars so that they cannot be moved upwardly into the path of the tabulating stops on the traveling carriage. This allows the traveling carriage to tabulate until stops located in predetermined columnar positions at the back of the traveling carriage release the tabulating stop bars so that they may be spring-urged into the path of the tabulating stops.

Two types of stops are used in connection with the skip-tabulating mechanism, one of which functions when the skip-tabulating bar is depressed and the weight of the hand immediately removed therefrom, but is ineffective when the skip-tabulating bar is retained depressed. The other type of stop functions either when the hand is removed from the skip-tabulating bar immediately after depression or when the skip-tabulating bar is retained depressed. Thus by holding down the skip-tabulating bar the first type of stop is rendered ineffective and the traveling carriage will tabulate until one of the latter stops releases the tabulating stop bars. The skip-tabulating mechanism will now be described in detail.

Directing attention to Figs. 7, 19 and 20, the tabulating lever 135 has therein an opening adapted to receive the foot of a lever 205 pivoted on a tabulating frame 206 which extends between the main frames 30 and 31. The lever 205 cooperates with a lever 207 pivoted on a stud 208 secured in the frame 206. The lever 207 has a raised surface 209 which cooperates with a stud 210 in an escapement control plunger 211 supported for vertical sliding movement in a groove in an extension 212 of the frame 206. A spring 213 is tensioned to urge the lever 207 counter-clockwise to normally maintain an upper raised portion 214 thereof in contact with the lower surface of the extension 212.

The lever 207 (Fig. 20) carries a stud 215 which extends through a slot 216 in a tabulating stop bar 217 the upper end of which is loosely supported in a vetrical groove in the tabulating frame 206. The right edge of the bar 217 as here observed cooperates with a rounded projection 218 of a latch 219 pivoted to the frame 206. A torsion spring 220 urges the latch 219 clockwise into contact with a stud 221 carried by the lever 207. A torsion spring 222 cooperates with a stud 223 in the bar 217 to urge said bar upwardly to normally maintain the lower end of the slot 216 in contact with the stud 215.

Pivoted on the stud 208 (Fig. 19) is a lever 224 with an enlarged portion 225 arranged to cooperate with the pin 210 in the plunger 211. A torsion spring 226 urges the lever 224 counter-clockwise to normally maintain an upwardly extending portion 230 thereof in contact with the lower surface of the extension 212. A stud 231 pivotally connects the lever 224 to an escapement control bar 232 supported in the same vertical groove as the bar 217 and urged counter-clockwise by a spring 227. The pin 223 in the bar 217 extends through an opening 233 in the bar 232. The bar 232 has a recess 234 with a notch 235 therein which cooperates with a square stud 236 in a stop plate 237 pivoted at 238 to the tabulating frame 206 and maintained in contact with a stud 239 by a spring 240.

Directing attention to Fig. 3, after impression is complete, clockwise or downward movement of the tabulating lever 135, effected either manually by means of the tabulating keys or automatically by means of the hook 137, rocks the lever 205 counter-clockwise as observed in Figs. 19 and 20. The lever 205 imparts a clockwise movement to the lever 207, the spring 222 in cooperation with the stud 223 lifts the bar 217 upwardly until its upper end is in the path of the tabulating stop 120. The latch 219 influenced by the spring 220, hooks over the stud 221 to retain the lever 207 in its moved position. The hump 218 of the latch 219 engages and rocks the bar 217 into contact with the left hand side of the enlarged groove in the tabulating frame 206. Clockwise movement of the lever 207 also moves the escapement control plunger 211 downwardly. Any suitable form of escapement mechanism may be employed to control the tabulating movement of the carriage. One form of such mechanism is shown in Figs. 19—A and 19—B and will now be described. Downward movement of the plunger 211 (Fig. 19—A) by means of an aperture in the lower end thereof in cooperation with the tail of a bell crank 470, pivoted on a bracket 471 secured in the frame 206, rocks said bell crank counter-clockwise. Counter-clockwise movement of the bell crank 470, by means of a connecting link 472, imparts clockwise movement to a bell crank 473 pivoted at 474 to the cross frame 157. The bell crank 473, which is connected by a link 475 to one arm of the yoke 476 loose on a shaft 477 journaled in the frame 157, transmits its clockwise movement to said yoke 476. Clockwise movement of the yoke 476 causes an extension 478 (Fig. 19—B) thereof to rock the tooth of a spring urged escapement retaining pawl 479 out of mesh with the teeth of an escapement ratchet 480 to free the traveling carriage for tabulating movement. The pawl 479 is pivoted on a stud 481 in the frame 157 and the ratchet 480 is secured on the lower end of a shaft 482 journaled in a bushing 483 threaded in the frame 157. The escapement ratchet 480 is connected to the traveling carriage by means of a pinion 484 which is secured to the upper end of the shaft 482 and said pinion 484 meshes with a rack 485 secured to depending lugs of the traveling carriage frame 34. The traveling carriage is now free to tabulate toward the right, as observed in Fig. 19, under the influence of a conventional type of spring-urged drum 486 (Fig. 10) mounted on the case 33 and connected by a cable 487 to a stud 488 secured in the carriage frame 34. As the bar 217 moves upwardly the stud 223 cooperating with the slot 233 lifts the bar 232 and the lever 224 upwardly in unison therewith. From the above it is obvious that the spring 222 is strong enough to overcome the action of the springs 226 and 227. Near the terminus of the upward movement of the bar 232 the spring 227 urges said bar toward the left to latch the notch 235 over the stud 236 in the plate 237.

While the traveling carriage is tabulating toward the right as viewed in Fig. 19, the stop 120 engages first the upper end of the bar 217 which protrudes farther toward the left than the upper end of the bar 232. The impact of the traveling carriage is absorbed by the bar 217 which is forced against the right side of the groove in the frame 206. This movement of the bar 217 toward the right releases the latch 219 from the stud 221 in the lever 207. This sudden stop causes the traveling carriage to rebound slightly and during this rebounding the spring 213 returns the levers 207 and 205 and the bar 217 downwardly to normal position, thus removing the upper end of said bar 217 from the path of the traveling carriage stop 120. It will be noted that the bar 232 has not thus far been engaged by the stop 120 and therefore remains in its upward position which by means of the enlarged portion 225 of the lever 224 in cooperation with the pin 210 retains the plunger 211 downwardly to prevent reengagement of the escapement mechanism with the traveling carriage. When the traveling carriage returns from rebounding, the stop 120 contacts the upper end of the bar 232 to disengage the notch 235 from the stud 236. The spring 226 then returns the lever 224 counter-clockwise and the bar 232 downwardly out of the path of the stop 120. This counter-clockwise movement of the lever 224 allows the escapement control plunger 211 to be returned upwardly by resilient means (not shown) to reengage the escapement pawl 479 (Fig. 19—A) with the ratchet 480 to retain the traveling carriage in its tabulated position.

As a safety precaution to prevent damage in case the traveling carriage is accidentally returned toward the left after the tabulating stop bars 217 and 232 have been moved upwardly into the path of the tabulating stops 120, the upper ends of said bars have angular surfaces over which the stops 120 ride forcing the bar 217 downwardly flexing the spring 222 and likewise forcing the bar 232 downwardly rocking the plate 237 counter-clockwise against the tension of the spring 240.

Calling attention to Figs. 3, 8 and 19, the lever 224 has an angular projection 241 cooperating with the upper hooked end of a latch 242 pivoted on a racket 243 secured to the tabulatnig frame 206. The latch 242 carries a stud 244 embraced by the bifurcated end of an upward extension of a link 245 slotted on its forward end to receive a stud 246 in a lever 247 pivoted on a stud 248 in the frame 31. The lever 247 is slotted to receive a stud 249 in a stem 250 of a skip tabulating bar 251 the upper end of which is loosely supported in an aperture in the keyboard plate 78. The bar 251 overlies an extension 252 of the starting bar 64 with the obvious result that depression thereof also depresses the starting bar 64 to release the machine for operation. A spring 253 is tensioned to return and retain the bar 251 in home position at the end of machine operation. A spring 254 forms a resilient connection between the bar 251 and the lever 247 so that these members may be moved independently of each other when required.

The rearward end of the link 245 is pivoted to the lower end of a lever 255 loose on a stud 256 secured in the totalizer frame. Pivoted on the upper end of the lever 255 is a lever 257 a forward extension of which has steps 258 and 259 resiliently urged into communication with a stud 260 in the frame 31 by a spring 261 stretched between said stud 260 and an ear of the lever 257. An upward extension of the lever 257 is pivoted to a right angled projection of a plate 263 slidably supported by a stud 264 secured in the carriage ball race 35. Relative movement between the levers 255 and 257 is governed by means of a projection 265 of the lever 257 and a stud 266 secured in said lever cooperating with the upper end of the lever 255. The plate 263 carries a roller 267 which cooperates with the camming surfaces of skip tabulating blocks 268 and 269 (see also Figs. 17 and 18) secured on an angular bar 270 fast to the frame of the traveling carriage 34. The bar 270 has a series of holes which in cooperation with screws threaded in the blocks 268 and 269 provide an easy means of locating said blocks in various columnar positions.

Depressing the skip tabulating bar 251 (Figs. 3 and 8) by means of the spring 254 rocks the lever 247 counter-clockwise as observed in Fig. 3, which by means of the link 245 rocks the lever 242 also counter-clockwise to hook said latch over the projection 241 of the lever 224 (see also Fig. 19). This forward movement of the link 245 rocks the lever 255 clockwise to move the lever 257 and the plate 263 rearwardly until the step 258 passes beyond the lower edge of the stud 260. The spring 261 then rocks the lever 257 clockwise so that the step 258 is opposite the rearwardly disposed surface of the stud 260. An extension 271 of the lever 257 in cooperation with the lower surface of the stud 260 limits the clockwise movement of said lever 257. Depressing the skip tabulating bar 251 by means of the extension 252 also depresses the starting bar 64. This as previously explained allows the hook 137 to latch over the pin 134 and carry the lever 135 downwardly which by means of the lever 205 (Figs. 19 and 20) rocks the lever 207 clockwise against the tension of the spring 213 so that the latch 219 hooks over the stud 221. The latch 242 restrains the lever 224 and the bar 232 against upward movement, consequently the opening 233 in said bar 232 in cooperation with the stud 223 likewise restrains upward movement of the bar 217. Therefore the lever 207 moves independently of the bar 217 the stud 215 moving idly in the slot 216.

It will be recalled that clockwise movement of the lever 207 moves the escapement control plunger 211 downwardly to disengage the escapement mechanism from the traveling carriage. Consequently the traveling carriage is now free to tabulate without interruption as the bars 217 and 232 are retained out of the path of the stops 120.

It will be remembered that there are two types of camming blocks used in connection with the skip-tabulating mechanism. One of these blocks 268 (Figs. 15 and 18) functions when the skip-tabulating bar 251 (Fig. 3) is depressed, and the weight of the hand immediately removed therefrom. Retaining the skip tabulating bar depressed prevents the camming block 268 from functioning but has no influence on the action of the camming block 269 (Fig. 17). During tabulation of the traveling carriage the stop 263 engages the roller 267 to rock the lever 257 counter-clockwise thereby disengaging the step 258 from the rearwardly disposed surface of the stud 260. The spring 261 then rocks the lever 255 counter-clockwise until the step 259 of the lever 257 again engages the stud 260. This counter-clockwise movement of the lever 255 returns the link 245 rearwardly to rock the latch 242 clockwise out of engagement with the projection 241 of the lever 224 (see also Fig. 19). This frees the lever 224 and the stop bars 217 and 232 to the action of the spring 222 which forces them upwardly into the path of one of the stops 120 carried by the traveling carriage which in cooperation with said stop bars positions the traveling carriage in the manner explained earlier herein.

When the bar 251 (Fig. 3) is retained depressed the lever 257 is rocked counter-clockwise by the camming block 268 without imparting any movement to the lever 255 and link 245. This is due to the fact that the tension of the spring 261 is insufficient to overcome the spring 254. Therefore the traveling carriage continues to tabulate until one of the camming blocks 269 (Figs. 15 and 17) with maximum throw engages the roller 267 (Fig. 3). The cam 269 imparts greater counter-clockwise movement to the lever 257 than the cam 268 thereby causing the stud 266 to engage the lever 255 to impart counter-clockwise movement thereto. This moves the link 245 rearwardly to disengage the latch 242 as explained above to allow the stop bars 217 and 232 to move upwardly into the path of the proper stop 120. Rearward movement of the link 245 imparts clockwise movement to the lever 247, which is free to move independently of the stem 250 of the bar 251 due to the slot therein cooperating with the stud 249.

Fig. 3 depicts the parts of the skip tabulating mechanism in the positions they invariably occupy when the machine is at rest and to which positions they are restored soon after printing is complete. As the traveling carriage may be returned from tabulated positions only after printing is complete, Fig. 3 likewise depicts the positions of the skip tabulating parts during carriage return. Therefore the roller 267 is out of the path of the camming surface of the block 268. However, the camming block 269 engages the roller 267 and rocks the lever 257 a slight distance counter-clockwise. This counter-clockwise movement of the lever 257 however is not sufficient to disengage the step 259 from the stud 260 and after the camming block moves beyond the roller the spring 261 returns the lever 257 to the position here shown.

From the foregoing description it will be seen that in addition to the usual step by step tabulating from one column to the next, that by using the skip tabulating mechanism just described in conjunction with the stop 268 it is possible to skip tabulate the traveling carriage through several columnar positions to a certain columnar position determined by the position of said camming block 268. It will also be seen that the use of the skip tabulating mechanism in conjunction with the stop 269 makes it possible to skip-tabulate the traveling carriage through the regular columnar positions and also through the columnar positions determined by the camming block 268 to a particular columnar position determined by the position of the camming block 269.

Balance key locking mechanism

In the machine of the instant invention mechanism has been devised to enforce the printing of the balance in a certain column of the record sheet. This mechanism is normally effective to lock the balance key against depression and is rendered ineffective only when the traveling carriage is tabulated to certain columnar positions.

Directing attention to Figs. 8 and 9 when the traveling carriage is tabulated to certain columnar positions a downward projection 277 of the stop 120 engages an upturned extension 272 of a hanging bar lever 273 to rock said lever clockwise as here observed on its pivot 274 of the tabulating frame 296. Clockwise movement of the lever 273 lifts a hanging bar 275 which by means of a stud 276 therein in cooperation with a slot in a plate 280 rocks said plate clockwise on its pivot stud 281 secured in the left frame 30. The rearward end of a pitman 282 is pivoted to the plate 280 while the forward end thereof is slotted to embrace a stud 283 in the frame 30. Consequently clockwise movement of the plate 280 moves the pitman 282 rearwardly to disengage a right-angled projection 284 thereof from a notch 285 in the balance key 118. This unlocks the balance key 118 so that it may be depressed to print the balance in the proper column of the record material. When the traveling carriage is moved from this particular position and the stop 120 no longer engages the lever 273, a spring 286 returns the associated parts to normal position as here shown so that the projection 284 of the pitman 282 will reengage the notch 285 in the balance key 118.

Machine release by balance key

Referring to Figs. 8 and 9, depressing the balance key 118 moves the notch 285 therein opposite an extension 287 of a latch 288 loose on a stud 289 secured in the frame 30. This allows a spring 290 to rock said latch 288 clockwise which by means of a stud 291 in an extension 292 of said latch in cooperation with an extension of an arm 293 secured on a shaft 294 journaled in the frames 30 and 31 rocks said shaft 294 counter-clockwise as here observed. Secured on the right end of the shaft 294 is an arm 295 bifurcated to receive a stud 296 in the plate 67. It is therefore obvious that counter-clockwise movement of the shaft 294 by means of the arm 295 rocks the plate 67 clockwise as observed in Fig. 8, and counter-clockwise as observed in Figs. 3 and 7 to release the machine for operation in the usual manner.

It is generally the practice to allow the extension 287 of the latch 288 to bear directly upon the edge of the key stems but in this instance the strength of the spring 290 is sufficient to overcome the action of the compression spring which returns the key 118 upwardly upon release thereof. If under the above condition the balance key 118 were partially depressed it would be retained in that position thereby causing an undesired effect and a possible jamming of mechanism upon operation of the machine. It was also found that accidentally or carelessly retaining the balance key depressed at the end of machine operation prevented the proper functioning of the regular non-repeat mechanism and resulted in the jamming of the machine mechanism. Therefore in order to overcome these undesirable conditions means were provided to prevent the extension 287 of the latch 288 bearing on the edge of the key stem and to make the restoring of the latch 288 at the end of machine operations independent of the release of the balance key 118. This latter being in effect an auxiliary non-repeat mechanism for the machine.

Describing in detail the mechanism outlined above the spring 290 (Figs. 8 and 9) normally maintains the extension 287 of the latch 288 against a vertical surface 297 of a latch pawl 298 pivoted at 299 to the left frame 30 and urged clockwise by a spring 300 against a stop stud 301 secured in the frame 30. The pawl 298 has a notch 302 which cooperates with a bent-over ear 303 of a plate 304 urged clockwise by a spring 305 and rotatably supported by a bracket 306 secured on the stem of the balance key 118.

Depression of the balance key 118 causes the ear 303 of the plate 304 to engage the lower surface of the notch 302 to rock the latch pawl 298 counter-clockwise to disengage the surface 297 thereof from the extension 287 of the latch 288. This allows the extension 287 to enter the notch 285 in the stem of the key 118 and in so doing said extension engages and rocks the plate 304 counter-clockwise to disengage the ear 303 from the notch 302 in the pawl 298. This frees the pawl 298 to the action of the spring 300 and when the latch 288 is restored counter-clockwise near the end of machine operation the pawl 298 snaps into position to hold the extension 287 out of contact with the stem of the key 118 and to prevent clockwise releasing movement of the latch 288 in case the balance key 118 is retained depressed after operation is complete. It is therefore evident that the device just described prevents excessive drag on the stem of the balance key 118 and also serves as a non-repeat mechanism in case the balance key is inadvertently retained depressed.

Traveling carriage return mechanism

The instant machine is equipped with three carriage return bars, depression of which actuates mechanism that causes the traveling carriage to be returned to different columnar positions. In addition, one of the bars is adapted to release the machine for operation to cause the platen roll to be line-spaced during the return of the traveling carriage. The carriage return mechanism will now be described.

Referring to Figs. 10, 11, 12 and 13, pivoted respectively on studs 307, 308 and 309 secured in the machine case 33 are carriage return bars 310, 311 and 312 to which are pivoted respectively the forward ends of pitmans 313, 314 and 315. The rear ends of the pitmans 313, 314 and 315 are bifurcated to embrace a stud 316 in a plate 317 secured to the case 33. The pitmans 313, 314 and 315 have respectively camming apertures 318, 319 and 320, which cooperate with a stud 321 in a lever 322 pivoted on the stud 316. The lever 322 carries a stud 323 upon which is pivoted an arm 324 flexibly connected to said lever by means of a spring 325. The arm 324 has projections 326 and 330 which cooperate respectively with stops 331 and 332 (Figs. 10 and 14) mounted on a bar 333 secured by a plurality of studs 334 to brackets 335 and 336 fast to the traveling carriage frame. Screws threaded in the stops 331 and 332 in cooperation with a plurality of holes in the bar 333 provide a convenient means of locating said stops 331 and 332 in the desired columnar positions. Pivoted on the plate 317 is an arm 337 with a stud 338 urged by a spring 339 into communication with a series of notches 340 in the lever 322, said notches corresponding to the three positions of said lever 322.

Referring to Fig. 10, slidably supported in a vertical slot in the plate 317 is a stud 341 carrying a roller 342, which cooperates with camming surfaces on the upper edges of the pitmans 313, 314 and 315 in a manner presently to be described. The stud 341 is secured in a link 343 the upper end of which is loosely connected to a lever 344 pivoted at 345 to the machine case 33. The rearwardly disposed end of the lever 344 (Fig. 16) cooperates with a lever 346 fulcrumed on a stud 347 in the machine case. The lever 346 is connected by closely wound springs 348 to a lever 349 pivoted to a carriage return gear frame 350. The rounded end of the lever 349 extends within an annular groove in the hub of a carriage return gear 351 loose on a vertical shaft 352 journaled in the frame 350 and operatively connected to the machine motor. The return gear 351 has a plurality of clutch teeth arranged to cooperate with similar teeth in a return gear driving disk 377 secured on the shaft 352. The gear 351 meshes with a return rack 353 slidably mounted by means of a plurality of symmetrical slots 354 in cooperation with the studs 334. The carriage return bars 310, 311 and 312 are yieldingly retained in normal positions by springs 355, 356 and 357.

Depressing the carriage return bar 310 (Figs. 10 and 11) moves the pitman 313 forwardly causing the aperture 318 therein in cooperation with the stud 321 to position the lever 322 and the arm 324 as here shown in which position the projections 326 and 330 of said arm are out of the path of the stops 331 and 332. Simultaneously the camming surface on the pitman 313 in cooperation with the roller 342 moves the link 343 upwardly to rock the lever 344 counter-clockwise which in turn rocks the lever 346 (Fig. 16) clockwise. Clockwise movement of the lever 346 by means of the spring 348 shifts the lever 349 counter-clockwise to raise the return gear 351 so that its clutch teeth are moved into communication with the teeth of the driving disk 377. A spring-pulled retaining pawl 358 cooperating with a downward projection of the lever 349 retains said lever and the return gear 351 in either of their positions. The member 377 revolves the return gear 351 in the direction indicated by the arrow to return the traveling carriage toward the left, as viewed from the rear of the machine in Fig. 16. When the traveling carriage arrives at starting position a left marginal stop blocks further return movement thereof. However the rack 353 continues to move independently of the carriage flexing a spring 359. Guided by the slots 354 in cooperation with the studs 334, the rack 353 receives a downward movement near the terminus of its independent movement, which in cooperation with a flange 360 of the return gear 351 forces said gear downwardly out of engagement with the driving disk 377. The spring 359 then returns the rack 353 to its normal position. The regular carriage escapement mechanism retains the carriage in its returned position after the return gear is disengaged from its driving disk.

The shock of the return of the rack 333 is absorbed by a spring-pushed plunger 361 (Fig. 4) loosely supported in the bent-over ears of a bracket 362 secured to the traveling carriage frame, said plunger 361 being engaged by a stud 363 in the rack 353. The plunger 361 also acts as a stop to locate the carriage return rack 353 in its normal position.

Referring to Figs. 10 and 12 depressing the carriage return bar 311 moves the pitman 314 forwardly causing the camming aperture 319 therein, in cooperation with the stud 321 to rock the lever 322 and the arm 324 to the position indicated by dot and dash lines in Fig. 12. In this position the projection 330 of said arm is in the path of the stop 332. Simultaneously the camming surface of the rearward end of the pitman 314 in cooperation with the roller 342 shifts the carriage return gear 351 (Fig. 16) upwardly into engagement with its driving disk 377, as explained above. This causes the traveling carriage to be returned toward the left until the stop 332 contacts the projection 330 to stop the traveling carriage in a predetermined columnar position. The carriage return rack continues its movement relatively to the traveling carriage to disengage the carriage return gear 351 from the disk 353 in the manner described above.

Directing attention to Figs. 10, 13 and 16 depressing the carriage return bar 312 moves the pitman 315 rearwardly causing the camming aperture 320 therein, in cooperation with the stud 321 to rock the lever 322 and the arm 324 to the position indicated by dot and dash lines in Fig. 13. In this position the forward projection 326 of said arm 324 is in the path of the stop 331. Rearward movement of the pitman 315 causes the camming surface thereon to shift the roller 342 and associated mechanism to move the carriage return gear 351 upwardly into engagement with its driving disk 377. This causes the traveling carriage to be returned in the manner explained above until the stop 331 engages the projection 326 of the arm 324. The rack 353 then disengages the carriage return gear 351 from the disk 377 in the manner explained above to position the traveling carriage in a predetermined columnar position.

When the traveling carriage is being tabulated from left to right as viewed from the rear of the machine, angular surfaces 327 and 328, (Fig. 14) on the stops 331 and 332 cooperate respectively with the projections 326 and 330 of the arm 324 (Fig. 13) to move said arm clockwise to its ineffective position. The plate 58 (Fig. 10) in cooperation with an ear 378 of the lever 322 returns said lever and the arm 324 clockwise to ineffective position during the initial part of each machine operation.

It will be recalled that the stud 338 in the arm 337 in cooperation with the notches 340 in the lever 322 retains said lever and the arm 324 in their various positions.

In addition to returning the traveling carriage, depressing the bar 312 (Figs. 7, 10 and 13) also releases the machine for an idle operation by depressing the vertical feed bar 186, the sole purpose of said operation being to line space the platen. Depressing the bar 312 also unlocks the normally locked machine releasing mechanism simultaneously with the depression of the vertical feed bar. A link 394 connects a downward extension of the bar 312 to a pawl 395 loose on a stud 396 in the frame 31. A nose of the pawl 395 cooperates with a projection 397 of the stem of the bar 186. Another extension of the bar 312 has a stud 460 coacting with a V shaped surface on an arm 461 secured on a release control shaft 462 journaled in the frames 30 and 31. The upper end of the arm 461 is bifurcated to embrace a stud 463 in an extension of a locking plate 464 pivoted at 465 to the frame 30 and a downward portion of which has a step 466 cooperating with a square stud 467 in the release plate 67.

The shaft 462, the arm 461, and the plate 464 are normally under the control of the control keys 118 and 119 (Fig. 2) and the hanging bar levers, the latter being actuated by the traveling carriage in columnar positions thereof. Depression of one of the control keys or tabulation of the carriage to certain columnar positions rocks the shaft 462 and arm 461 counter-clockwise (Fig. 7) and the plate 464 clockwise to move the step 466 out of the path of the stud 467 to permit counter-clockwise releasing movement of the plate 67. Likewise depression of the return bar 312 by means of the stud 460 cooperating with the arm 461 rocks the plate 464 to ineffective position. Depression of the bar 312 by means of the link 394 rocks the pawl 395 counter-clockwise causing the nose thereof in cooperation with the projection 397 to depress the vertical feed bar 186 to cause an idle machine operation to line space the platen.

*Platen feed disabling mechanism*

The instant machine is equipped with mechanism to feed the platen roll upon return of the traveling carriage either to starting position or any of its intermediate positions. This mechanism is so arranged that independent movement of the carriage return rack 353 (Fig. 16) after the traveling carriage has been returned to the proper column moves the platen feed bail 162 (Fig. 7) downwardly to feed the platen. This mechanism is well shown in Figs. 4, 5 and 6, and will now be described in detail.

The right hand vertical extension of the carriage return rack 353 has a camming projection 364 which cooperates with a roller 365 on an eccentric stud 366 secured to an arm 367 pivoted on a stud 368 in the bracket 362 secured to the traveling carriage frame. Turnably mounted on the stud 368 is an arm 369 with a bushing 370 loosely supporting a spring plunger 371 having secured to the upper end thereof (Fig. 6) a knob 372. The bushing 370 and knob 372 have notched cuts and tenons which when meshed allow the downward end of the plunger 371 to enter an aperture in the arm 367 to connect said arm 367 and the arm 369 for unitary movement. Lifting the knob 372 as viewed in Fig. 6 disengages the plunger 371 from the arm 367 and turning said knob 180 degrees in either direction so that the tenons are opposed retains said plunger disengaged from said arm. 367. A right-angled extension 373 of the arm 369 has an upturned lip which cooperates with a stud 374 secured at the right end of the feed bail 162 in the curled lower edge thereof.

As previously explained when the traveling carriage is stopped in its return movement by any one of the various stops, the carriage return rack 353 continues to move toward the left (as viewed in Fig. 4) independently of the traveling carriage to disengage the carriage return mechanism. This movement of the rack 353 causes the camming extension 364 thereof in cooperation with the roller 365 to rock the arm 367 counter-clockwise or downwardly. If the plunger 371 engages the aperture in the arm 367, the arm 369 will be moved in unison therewith and by means of the extension 373 in cooperation with the stud 374 (Fig. 4) will rock the platen feed bail 162 downwardly to feed the platen roll in the manner previously explained. Obviously disengaging the plunger 371 (Fig. 5) from the arm 367 disables the automatic feed of the platen roll upon return of the traveling carriage. It will be recalled that the bail 162 (Fig. 4) after its feeding movement is completed is spring-returned upwardly to normal position. This also returns the arms 367 and 369 when they are coupled together. When the arms uncoupled the arms 367 is returned upwardly by a spring 375 (Fig. 5) tensioned between said arms.

A full stroke device is provided to insure that the arms 367 and 369 and the bail 162 complete their feeding movements. Secured on a stud 376 in the bracket 362 (Figs. 4 and 6) is a full stroke pawl 380 with teeth 381 adapted to cooperate with a beveled upper edge 382 of the extension 373 of the arm 369. The pawl 380 has a right angled projection 383 which cooperates with a stud 384 in the camming extension 364 of the carriage return rack 353. A spring 385 urges the pawl 380 counterclockwise which movement is blocked by the stud 384 when the rack 353 is in normal position. However when the rack 353 moves toward the left independent of the traveling carriage to feed the platen roll the stud 384 moves away from the extension 383 of the full stroke pawl 380 allowing the spring 385 to engage the ratchet teeth 381 of said pawl with the beveled edge 382 of the extension 373. While the arm 369 is moving downwardly to operate the bail 162 the edge 382 ratchets over the teeth in the pawl 380 to prevent the arm and bail backing up before their full stroke has been completed. The pawl 380 retains the arm 369 and bail 162 in fed position until return movement of the rack 353 causes the stud 384 to engage the extension 383 to rock the pawl 380 clockwise out of engagement with the beveled edge 382 of the arm 369. The bail and arm are then returned to normal position by yieldable means cooperating with said bail.

A full stroke device compels complete movement toward the left of the carriage return rack 353 (Fig. 16). This mechanism includes a full stroke pawl 386 pivoted on a stud 387 in the bracket 335 secured to the traveling carriage frame. A spring 388 stretched between the pawl 386 and the bracket 335 is so positioned with relation to the pivot point of said pawl 386 that with slight movement of said pawl 386 tension is exerted on either side of the pivot point 387. As pictured in Fig. 16, the spring 388 urges the pawl 386 into engagement with a series of ratchet teeth on a plate 389 secured to the left hand upward extension of the rack 353. When the rack 353 moves independently of the traveling carriage to disengage the carriage return gear and to feed the platen roll, the pawl 386 ratchets over the teeth in the plate 389 to prevent return movement of said rack 353 until the full stroke is completed. As the rack 353 completes its independent movement a stud 390 in the plate 389 engages an extension 391 of the pawl 386 and rocks said pawl clockwise out of engagement with the ratchet teeth. This clockwise movement of the pawl 386 is sufficient to divert the tension of the spring 388 to the other side of the fulcrum point 387, consequently said spring urges said pawl 386 clockwise into engagement with a stop stud 392 in the bracket 335. The rack 353 is now free to be returned toward the right by the spring 359 and near the end of this return movement a stud 393 in the plate 389 returns the pawl 386 counter-clockwise into engagement with said plate and the ratchet teeth therein.

*Carriage return bar locking mechanism*

At the beginning of machine operation means operated by the main drive shaft locks the carriage return bars against depression, and they remain locked during the first half-cycle of machine operation in the course of which the impression is taken. This mechanism is illustrated in Fig. 10 and will now be described.

The drive arm 61 carries a stud 398 which engages the bifurcated upper end of an arm 399 loose on the shaft 62. A link 400 connects the arm 399 to an arm 401 having secured thereto a pair of symmetrical friction members between which a spring 402 is tensioned. The friction members embrace a hub 403 of a lock lever 404 loose on a stud 405 secured in the plate 317. A right angled projection 406 of the lever 404 cooperates with notches 407 and 408 in pitmans 313 and 314 and with an abrupt surface 409 of the pitman 315 (see also Figs. 11, 12 and 13). Movement of the lever 404 is limited by a stud 410 in the plate 317 in cooperation with a hook-shaped extension of said lever 404.

As the arm 61 starts its initial movement upward the arm 399 and the link 400 rock the arm 401 counter-clockwise which movement by means of the friction members is transmitted to the arm 404 to move the projection 406 into the notches 407 and 408 in the pitmans 313 and 314 and in the path of the abrupt surface 409 of the pitman 315 to lock the carriage return bars against manipulation. It can readily be seen that only a fraction of the movement imparted to the arm 401 by the main drive arm 61 is required to move the locking arm 404 into effective position and while the arm 401 is completing its initial movement counterclockwise the friction members slip idly around the hub 403. At the beginning of the return movement clockwise of the main drive arm 61 the arm 401 rocks the locking arm 404 clockwise to disengage the projection 406 from the notches 407 and 408 in the pitmans 313 and 314 and to move said projection out of the path of the abrupt surface 409 of the pitman 315. The upwardly extending hook on the arm 404 cooperating with the stud 410 limits the return clockwise movement of said arm and the arm 401 completes its return movement with the friction members slipping around the hub 403. As a safety measure, in case the friction is not sufficient to disengage the projection 406 from the return bar pitmans the arm 401 near the end of its return movement clockwise engages a stud 411 in the arm 404 to positively rock said arm to ineffective position.

Summarizing briefly, it will be seen that the mechanism just described locks the carriage return bars against manipulation during the first half-cycle of machine operation in the course of which the impression is completed. Immediately after the impression is taken the carriage return bars are unlocked for use as the traveling carriage may now be returned without danger of harming the machine mechanism.

*Modified form*

The modified form of mechanism pictured principally in Fig. 22 includes a positionable manipulative member to control the automatic tabulating of the traveling carriage, the automatic feeding of the platen roll and the impression mechanism. The modified form also includes a new type of manual tabulating mechanism necessitated by the relocation of the tabulating keys on the keyboard. In the modified form of mechanism as in the preferred form, depression of the starting bar 64 (Figs. 7 and 22) effectuates the automatic tabulating mechanism for the traveling carriage and simultaneously ineffectuates the platen roll feeding mechanism. Also the depression of the vertical feed bar 186 accomplishes just the reverse of the above that is prevents the functioning of the automatic tabulating mechanism and allows the platen roll feeding mechanism to function. However in the modified form of mechanism the manipulative member mentioned above in its various positions controls the automatic tabulating mechanism and the platen roll feeding mechanism independently of the starting bars 64 and 186, and when said member is in a particular position it also disables the impression mechanism. For example, when the manipulative member is in its first or normal position the bars 64 and 186 function normally, as related above. When the manipulative member is in second position the automatic tabulating mechanism is disabled and the platen feeding mechanism is controlled by the starting bars 64 and 186 in the usual manner. When the manipulative member is in third position the impression mechanism and the automatic tabulating mechanism are disabled and the platen feeding mechanism in conjunction with the bars 64 and 186 continues to function normally. With the manipulative member in fourth position the automatic tabulating mechanism is disabled and the platen roll feeding mechanism remains effective irrespective of which bar 64 or 186 is depressed. The modified form of mechanism will now be described in detail.

Manual tabulating mechanism

Directing attention to Figs. 22 and 23, secured to an auxiliary keyboard plate 427 similar to the plate 78 (Fig. 7) is a bracket 412 carrying a stud 413 which extends through a slot in a stem 414 of a tabulating key 415, the upper end of said stem 414 extending through an aperture in the auxiliary keyboard plate. The lower end of the stem 414 cooperates with a stud 416 in a lever 417 loose on a stud 418 in the frame 31. The lever 417 carries a flatted stud 419 which cooperates with the lower portion of a by-pass pawl 420 pivoted on the forward end of a tabulating lever 421 rotatably supported by a stud 422 in the frame 31. A torsion spring 423 urges the by-pass pawl 420 clockwise causing a stud carried thereby to engage a projection of the lever 421. The rearwardly disposed end of the tabulating lever 421 has a slot 424 which cooperates with the end of the tabulating lever 205 in exactly the same manner as described in the preferred form for the tabulating lever 135 (see Figs. 7 and 19). A spring 425 (Fig. 22) tensioned between the stud 416 and the bracket 412 urges the lever 417 clockwise to normally maintain the tabulating key 415 in its upward or undepressed position.

Depressing the tabulating key 415 rocks the lever 417 counter-clockwise causing the stud 419 to engage the lower end of the by-pass pawl 420 to rock the tabulating lever 421 clockwise to tabulate the traveling carriage in the well known manner. The stud 419 moves beyond the lower edge of the pawl 420 thus permitting the lever 421 to snap back into position when the tabulating stops engage the tabulating stop bars. When the tabulating key 415 is released the spring 425 returns the lever 417 clockwise, causing the flat surface of the stud 419 to by-pass the pawl 420 without imparting movement to the lever 421.

Mechanism to control the automatic tabulating, and platen feeding mechanisms and the impression mechanism As previously stated, the modified form of this invention embraces mechanism which in conjunction with the starting bar 64 and the vertical feed bar 186 (Fig. 22) controls the automatic tabulating mechanism, the automatic platen feeding mechanism and the impression mechanism. A detailed description of these mechanisms will now be given.

Calling attention to Figs. 22 and 24, pivoted at 428 on the bracket 412 is a lever 426 with a stud 430 embraced by a slot in a controlling plate 431 pivoted on the stud 71. The plate 431 has controlling notches 432, 433, 434 and 435 which cooperate with a stud 436 in a lever 437 rotatably supported by the stud 126 (see also Fig. 7). An upward extension of the lever 437 has a raised surface 438 which cooperates with the extension 131 of the tabulating control bar 132 in precisely the same manner as explained for the lever 125. The upward extension of the lever 437 is pivotally connected by a link 439 to an arm 440 pivoted on a downwardly extending portion of a printer top plate 441. The arm 440 has an upward extension which cooperates with a stud 442 in a plate 443 secured to one of a pair of arms 444 pivoted on upward extensions of the printer frame and supporting a cross bar 445 which cooperates with projections 446 of the printer segment arms 96. The lever 437 has a bent projection 447 which overlies the top edge of a lever 448 loose on the stud 126. Also loose on the stud 126 is an arm 449 flexibly connected to an upward extension of the lever 448 by a spring 450 which urges a stud 451 carried by said arm into contact with the upward extension of said lever 448. The arm 449 has a right angled extension 452 which cooperates with the stud 148 in the bar 149 in substantially the same manner as explained for the extension 147 (Fig. 7) of the lever 125.

The lever 448 has a stud 452 embraced by the bifurcated upper end of the link 123 and a projection 453 of said lever is arranged to cooperate with a stud 454 in the plate 431. A spring 455 urges the lever 437 counter-clockwise to maintain the projection 447 normally in contact with the lever 448 and a spring 456 urges the lever 448 also in a counter-clockwise direction.

It will be recalled that the lever 426 has four positions corresponding to the four notches in the plate 431. When the lever 426 is in its first position as shown in Figs. 22, 23 and 24 the notch 432 in the plate 431 is opposite the stud 436 said notch being sufficiently deep to allow normal counter-clockwise movement of the lever 437. Therefore depressing the starting bar 64 causes both the levers 437 and 448 to be moved downwardly by their springs 455 and 456 when the lever 70 rocks clockwise. This counter-clockwise movement of the lever 437 causes the surface 438 to engage the extension 131 of the bar 132 to move the downward extension 133 out of the path of the hook 137 thereby conditioning the machine for automatic tabulation. Counter-clockwise movement of the arm 448 causes the extension 452 of the flexible arm 449 to engage the stud 148 to move the bar 149 forwardly (see also Fig. 7) to disable the platen feeding mechanism. It is obvious that due to the projection 447 the lever 437 cannot move independently of the lever 448. Therefore depressing the bar 186 rocks the arm 190 clockwise to move the shoulder 191 in the path of the stud 452 to block counter-clockwise movement of both levers 448 and 437. Consequently the bar 132 remains in normal position to prevent the hook 137 engaging the stud 134 in the lever 421. Likewise the bar 149 receives no movement with the result that the traveling carriage remains stationary and the material wound around the platen roll is line-spaced.

Moving the lever 426 (Figs. 22, 24 and 25) to the second position moves the notch 433 in the plate 431 opposite the stud 436 to block counter-clockwise movement of the lever 437. It is therefore obvious that the automatic tabulating mechanism will remain ineffective regardless of which of the bars 64 or 186 is depressed. As the lever 437 has no influence upon the lever 448 this lever continues to function normally, that is, depressing the starting bar 64 causes the platen feeding mechanism to be disabled, and depressing the bar 186 allows said platen feeding mechanism to function.

Moving the lever 426 to its third position causes the plate 431 to engage the stud 436 to rock the lever 437 clockwise until said stud rests in the notch 434 to retain said lever in its moved position. This clockwise movement of the lever 438 by means of the link 439 imparts a clockwise movement to the arm 440, which in cooperation with the stud 442 rocks the arms 444 counter-clockwise against the tension of a spring 457 to move the bar 445 in the path of the projection 446 to block the printing movement of the arm 96 and the segment 95. It is apparent that with the lever 437 retained in this position no movement will be imparted to the bar 132, consequently the automatic tabulating mechanism remains disabled. The lever 448 in conjunction with the bars 64 and 186 functions normally at this time as it did in positions 1 and 2.

Moving the lever 426 to fourth position places the notch 435 in the plate 431 opposite the stud 436 and also places the stud 454 (Fig. 25) carried by said plate in the path of the projection 453 to block counterclockwise movement of the lever 448 which by means of the projection 447 also prevents movement of the lever 437. The notch 435 has the same radial location with relation to the pivot 71 as the notch 433, and consequently additionally blocks counterclockwise movement of the lever 437 and also serves to retain the plate 431 in position. It is therefore apparent that with the lever 426 in fourth position the automatic tabulating mechanism remains ineffective and the platen feeding mechanism remains effective regardless of which of the bars 64 or 186 is depressed.

The notches 432 to 435 inclusive in the plate 431 (Fig. 24) cooperating with the stud 436 in the spring-pulled lever 437 retains said plate 431 and the lever 436 in any of their four positions. When the lever 426 (Fig. 22) is moved out of the third position, which it will be recalled is a non-printing position, the spring 457 returns the arm 444 clockwise to normal position to move the bar 445 out of the path of the projection 446 to re-enable the impression mechanism.

*Operation of machine*

A system of operation embracing the novel mechanisms explained in the foregoing description will now be given. A typical but not exclusive example of use of the machine of the present invention is that of a department store doing an extensive charge business with a substantial number of customers. The usual custom is to have attached duplicate bills, a file copy and a customer's copy, such as that illustrated in Fig. 21 for each customer. These bills are generally posted daily by means of duplicate sales slips issued by the various departments during the preceding day. The sales slips bear the name and address of the purchasers, the date of the purchase, the number of the department in which the purchase was made, the name of the article or articles purchased, and the price of each article purchased. The original sales slips are wrapped with the purchases and the duplicate slips are gathered at the close of business and delivered to the accounting department where they are sorted and arranged alphabetically in preparation for the accounting machine operator.

At the end of the month the unpaid balance of each customer's account is transferred to a new duplicate bill. The old bills are then separated, the original portion mailed to the customers and the duplicates retained as reference file copies. The manner in which the bill for Richard Roe, shown in Fig. 21, was made out and the different items entered thereon will now be explained.

In making out a new bill for Richard Roe the operator inserts or winds the attached portions of a blank duplicate bill and its interposed carbon sheet around the platen roll of the machine of this invention. Next the bill is properly located so that the space for the address is opposite the type, and types the customer's name, Richard Roe, upon the bill. After the name of the customer is typed upon the bill, the operator depresses the "address" return bar 312 (Fig. 10) to return the traveling carriage and to cause the bill to be line-spaced in the manner set out hereinbefore. The operator then types the number and street of Richard Roe's residence, returns the traveling carriage and line-spaces the bill as before, and types the city and state. Next the operator returns the traveling carriage to starting position by depressing the "charge" return bar 310, which alines the printing point of the typewriter with the "date" column and the adding machine type with the "charge" column. After revolving the platen roll to locate the first line of the bill opposite the type carriers the operator types in the month, in this instance October, returns the traveling carriage to starting position by means of the "charge" return bar 310, ascertains Richard Roe's unpaid balance by observing his former bill, sets up this amount ($50.00) on the keyboard, and releases the machine for operation by depressing the skip tabulating bar 251 (Fig. 3). During this operation of the machine the amount ($50.00) is added in the balance totalizer and simultaneously printed in the "charge" column of Richard Roe's bill. After printing is complete the traveling carriage skip tabulates to the "balance" column and the operator depresses the balance key to condition the balance totalizer for a clearing operation and simultaneously release the machine for operation to print the amount of the balance ($50.00). After impression is completed the traveling carriage is automatically tabulated to the "pickup" column.

A new bill is made out for each customer in the above manner and filed away in alphabetical order. The operator in balancing the charge accounts for October 5 ascertains that upon this date Richard Roe made a purchase. This it will be recalled is done by means of the duplicate copies of sales slips which are delivered to the accounting department at the close of business each day. The operator withdraws Richard Roe's bill from the file places it in the machine and alines the proper line with the type carriers. It will be recalled that at the end of machine operation the "pickup" column of the bill is opposite the adding machine printing type. The operator ascertains the old balance from the last amount in the "balance" column, sets up this amount ($50.00) on the keyboard, and releases the machine for operation by depressing the vertical feed bar 186 (Fig. 7). If desirable or in case the machine is not equipped with a vertical feed bar, vertical platen feed may be effected by means of the release bar 64 in conjunction with one of the stops 120 located opposite the "pickup" column so that the extension 199 engages the plunger 200 to line space the platen in the manner explained above. In this operation the old balance ($50.00) is added in the previously cleared balance totalizer and simultaneously printed in the "pickup" column. In the system now being described the mechanism that automatically line spaces the platen upon return of the traveling carriage is retained disabled by means of the knob 372 (Fig. 6) and this necessitates the use of the vertical feed bar or the stop 120 in the above operation in order to line space the platen. The traveling carriage is then automatically returned to starting position by means of a return stop (not shown) rocking the lever 344 (Fig. 10) counterclockwise after which the date (October 5) is typed in the "date" column, the department number (3467) is typed in the "department" column, and the article purchased (tie) is typed in the "memo" column of the bill. The traveling carriage is then returned to starting position by means of the bar 310 and the amount of the purchase ($1.50) is entered on the keyboard and the machine released for operation by depressing the skip tabulating bar 251 (Fig. 3). In this operation the amount of the purchase ($1.50) is added in the balance totalizer and simultaneously printed in the "charge" column of the bill. After the impression is completed the traveling carriage skip-tabulates to the "balance" column where depressing the balance key causes the balance totalizer to be cleared and the new balance ($51.50) printed on the bill. After this operation the traveling carriage automatically tabulates to the "pickup" column in preparation for the succeeding operation.

In posting the bills for October 9 the operator comes to a sales slip for Richard Roe, which shows that on this date two items were purchased in the same department. The operator takes Richard Roe's bill from the file, inserts it in the machine, picks up the old balance in the manner explained above and returns the traveling carriage to starting position. Next the date (October 9) is typed in the "date" column, the department number (4623) is typed in the "department" column, and one of the articles purchased (candy) is typed in the "memo" column after which depressing the "charge" return bar 310 (Fig. 10) returns the traveling carriage to starting position. The amount of this candy purchase (50 cents) is entered on the keyboard and the machine released for operation by depressing the vertical feed bar 186 (Fig. 7) to line-space the platen and prevent automatic tabulation of the traveling carriage. In this operation the amount of the candy purchase (50 cents) is added in the balance totalizer and simultaneously printed in the "charge" column. After the above operation is complete the operator tabulates the traveling carriage to the "memo" column by using the manual tabulating key 415 (Fig. 22) or the typewriter tabulating lever (not shown) types the other article purchased (cigarettes) in the "memo" column and returns the traveling carriage to starting position by depressing the "charge" return bar. Next the price of the cigarettes ($1.25) is entered on the keyboard and the machine released for operation by depressing the skip tabulating bar after which the balance ($53.25) is taken in the usual manner.

On October 12 it will be noted that Richard Roe made two purchases in different departments for which separate sales slips were made out. In posting Richard Roe's bill for these purchases the operator picks up the old balance ($53.25) in the usual way, returns the carriage to starting position, types the date, (October 12) in the "date" column and the department number for the first purchase (2516) in the "department" column, and the article purchased (cap) in the "memo" column, after which the traveling carriage is returned in the usual manner by using the "charge" return bar. The operator then sets up the amount of the purchase ($2.50) on the keyboard and not knowing that there is another sales slip for that day releases the machine by using the skip tabulating bar in order to skip tabulate the traveling carriage to the "balance" column. Before a balance is taken the operator leafs over the sales slip for the cap and discovers another sales slip for Richard Roe for a purchase made on the same date (October 12). It will be noted that the space on the bill reserved for the address is in alinement with the "department" column. Consequently, after ascertaining that there is another item to be entered on the bill the operator depresses the "address" return bar 312 (Fig. 10), which causes the bill to be line-spaced and simultaneously returned so that the "department" column is opposite the typewriter printing point. The operator then types the department number (5237) on the bill, tabulates to the "memo" column, and types therein the article purchased (dress) and then returns the traveling carriage to starting position by depressing the "charge" return bar 310. The amount of the purchase ($14.95) is then entered on the keyboard and the machine released for operation by depressing the skip tabulating bar which after impression is made causes the traveling carriage to skip tabulate to the "balance" column. Depressing the balance key releases the machine for operation and causes the balance totalizer to be cleared to print the amount of Richard Roe's balance ($70.70) in the "balance" column, after which the traveling carriage automatically tabulates to the "pickup" column of the bill.

On October 14 Richard Roe made a payment upon his account and in handling this transaction the operator places the bill in the machine, picks up the old balance of $70.70 in the usual manner and returns the traveling carriage to starting position. Next the date, (October 15) is typed in the "date" column, the traveling carriage tabulated to the "memo" column by means of the key 415 (Fig. 22) or the typewriter tabulating lever and the word "cash" is typed therein. Next the operator depresses the "credit" return bar 311 (Fig. 10) to return the traveling carriage to the "credit" column, sets up the amount of the payment ($50.00) on the keyboard, and releases the machine for operation by depressing the starting bar 64 (Fig. 7). In this operation the amount of the payment ($50.00) is subtracted from the balance ($70.70) contained in the balance totalizer, and simultaneously printed in red in the "credit" column of the bill. After the impression is complete the traveling carriage is automatically tabulated to aline the "balance" column of the bill with the adding machine type carriers. In the final operation the "balance" key is depressed to cause the balance totalizer to be cleared and the amount of Richard Roe's balance ($20.70) printed in the "balance" column of the bill.

In the instant machine the No. 2 totalizer may be used to accumulate grand totals of any one of the three items, "charge," "credit," or "balance."

It might be well to repeat that in addition to the control keys shown in Fig. 2, the adding functions of both totalizers and the subtract function of the balance totalizer are controlled by hanging bar levers in cooperation with adjustable stops on the traveling carriage. This together with the adjustable return bar stop blocks and the adjustable skip tabulating bar camming blocks and the various other novel features combine to form a very flexible machine that may be adapted for use in most any business where accounts are balanced periodically.

While the form of mechanisms herein shown and described are admirably adapted to fulfill the object primarily stated, it is to be understood that it is not intended to confine the invention to the forms or embodiments herein disclosed for it is susceptible of embodiment in various forms all coming within the scope of the claims which follow.

I claim:

1. In a machine of the class described having a shiftable carriage supporting a platen roll, the combination of means to feed the platen; means to tabulate the traveling carriage; means including a machine release bar and mechanism actuated thereby to render effective the tabulating means and to simultaneously render ineffective the feeding means; and means whereby the traveling carriage in tabulated positions effectuates the feeding means irrespective of the rendering means.

2. In a machine of the class described having a traveling carriage supporting a platen roll, the combination of means to rotate the platen roll; means to tabulate the traveling carriage to different columnar positions; means including a machine release bar and mechanism actuated thereby to render effective the tabulating means and to simultaneously render ineffective the feeding means; means to control the rendering means; and adjustable means functioning when the traveling carriage is in predetermined columnar position to effectuate the feeding means regardless of the rendering means.

3. In a machine of the class described having a traveling carriage supporting a platen roll, the combination of means to rotate the platen; means to tabulate the traveling carriage to different columnar positions; means to release the machine for operation; means controlled by the releasing means to render effective the tabulating means and simultaneously render ineffective the rotating means; and adjustable stops on the traveling carriage functioning in tabulated positions thereof to effectuate the platen rotating means irrespective of the rendering means.

4. In a machine of the class described having a traveling carriage supporting a platen roll, the combination of means to rotate the platen; means to operate the rotating means; means, normally effective, to connect the rotating means to the operating means; means to disable the connecting means; and means whereby the traveling carriage in tabulated positions thereof renders the disabling means ineffective to cause the platen to rotate.

5. In a machine of the class described having a traveling carriage supporting a platen roll, the combination of means to rotate the platen roll; means to operate the rotating means; means connecting the rotating means to the operating means; means to release the machine for operation; means operated by the releasing means to render the connecting means ineffective; and means on the traveling carriage functioning in tabulated positions thereof to effectuate the connecting means regardless of the rendering means.

6. In a machine of the class described having a traveling carriage supporting a platen roll, the combination of means to feed the platen roll; means to operate the feeding means as an incident to machine operation; means rendered ineffective upon normal operation of the machine to connect the operating means to the feeding means; means to release the machine for operation and simultaneously prevent movement of the connecting means to ineffective position; means to advance the carriage to different columnar positions; means to return the carriage from any advanced position to a predetermined columnar position; and means whereby the returning means effectuates the releasing and preventing means.

7. In a machine of the class described having a shiftable paper carriage supporting a platen roll, the combination of means to feed the platen; means to operate the feeding means as an incident to machine operation; means rendered ineffective upon normal operation of the machine to connect the operating means to the feeding means; means to release the machine for operation and simultaneously prevent movement of the connecting means to ineffective position; means to advance the carriage to different columnar positions; means to return the carriage from any advanced position; manipulative means to effectuate the returning means and to predetermine the position to which the carriage is to be returned; and means whereby the manipulative means actuates the releasing and preventing means.

8. In a combined accounting machine and typewriter, the combination with a traveling carriage and escapement means to control lateral movement thereof; of adjustable stops on the traveling carriage; means cooperating with the stops to locate the traveling carriage in columnar positions; means to effectuate the cooperating means and simultaneously ineffectuate the escapement means; means to prevent effectuating the cooperating means irrespective of the above effectuating means; and adjustable means on the traveling carriage to control the preventing means.

9. In a machine of the class described, the combination with a traveling carriage and escapement means to control lateral movement thereof; of means to locate the traveling carriage in various columnar positions; means to move the locating means to effective position and simultaneously disable the escapement means; means to restrain movement of the locating means irrespective of the moving means; and variable means to disengage the restraining means from the locating means.

10. In a machine of the class described, the combination with a traveling carriage and escapement means to control lateral movement thereof, of means to interrupt lateral movement of the traveling carriage; means to move the interrupting means to effective position and simultaneously disable the escapement means; means to prevent movement of the interrupting means to effective position; means to effectuate the preventing means; and adjustable means to move the preventing means to ineffective position.

11. In a machine of the class described having a traveling carriage, the combination of means to interrupt the lateral movement of the carriage, said means normally in ineffective position; means operative as an incident to machine operation to move the interrupting means to effective position; means to prevent movement of the interrupting means to effective position irrespective of the moving means; manipulative means to effectuate the preventing means;

and means to move the preventing means to ineffective position.

12. In a machine of the class described with a traveling carriage, the combination of means to stop the carriage in various columnar positions, said means normally ineffective; means incidental to machine operation to move the stopping means to effective position; means to prevent moving the stopping means to effective position irrespective of the above moving means; manipulative means to effectuate the preventing means; and adjustable means located in predetermined columnar positions on the traveling carriage to move the preventing means to ineffective position.

13. In a machine of the class described, the combination with a laterally shiftable traveling carriage and escapement means to control lateral movement thereof, of means to stop the traveling carriage in various columnar positions; means incidental to machine operation to move the stopping means to effective position and to disable the escapement means; means to prevent movement of the stopping means to effective position irrespective of the above moving means; means to effectuate the preventing means and simultaneously release the machine for operation; and means to move the preventing means to ineffective position when the traveling carriage is in predetermined columnar positions and to allow the stopping means to move to effective position.

14. In a machine of the class described, the combination with a traveling carriage and resilient means to impart lateral shifting movement thereto; of members on the traveling carriage corresponding to the columnar positions thereof; means cooperating with the members to locate the carriage in columnar positions, said cooperating means normally ineffective; means to normally move the cooperating means into the path of the members each machine operation to tabulate the traveling carriage from column to column; manipulative means to temporarily restrain movement of the cooperating means to skip-tabulate the carriage past intermediate columns; and means to remove the restraining means when the traveling carriage arrives at a predetermined column.

15. In a machine of the class described the combination with a traveling carriage and resilient means to impart lateral tabulating movement thereto; of members on the traveling carriage corresponding to columnar positions thereof; means cooperating with the members to locate the carriage in various columnar positions, said cooperating means normally ineffective; means to normally move the cooperating means into the path of the members as an incident to machine operation to tabulate the traveling carriage from column to column; manipulative means to restrain movement of the cooperating means to cause the traveling carriage to skip-tabulate intermediate columns; adjustable elements on the traveling carriage; and means cooperating with the adjustable element to remove the restraining means when the carriage arrives at a predetermined column.

16. In a machine of the class described, the combination with a traveling carriage, resilient means to impart lateral movement thereto and escapement means to control lateral movement thereof; of members on the traveling carriage corresponding to columnar positions thereof; means cooperating with the members to interrupt lateral movement of the traveling carriage to locate said carriage in various columnar positions; means to move the cooperating means into the path of the members and to simultaneously disable the escapement means to tabulate the traveling carriage to the next column; means superseding the moving means to restrain movement of the cooperating means into the path of the members to skip-tabulate the carriage; adjustable elements on the traveling carriage; and means effectuated by the adjustable element to remove the restraining means when the carriage has skip-tabulated to the proper column.

17. In a machine of the class described having a shiftable traveling carriage, the combination of means to locate the traveling carriage in various columnar positions, said means normally ineffective; means to move the locating means to effective position; means to restrain the locating means irrespective of the moving means; manually operable means to effectuate the restraining means; and means influenced by the manually operable means to control release of the restraining means to cause the traveling carriage to skip-tabulate to the desired columns.

18. In a machine of the class described, the combination with a traveling carriage and resilient means to impart lateral tabulating movement thereto; of means to interrupt lateral movement of the traveling carriage to locate the same in various columnar positions; means to move the interrupting means to effective position and simultaneously release the traveling carriage to the action of the resilient means; means superseding the moving means to restrain movement of the interrupting means to effective position; manipulative means to effectuate the restraining means; several types of elements on the traveling carriage; means cooperating with the elements to release the restraining means; and means whereby manipulating the effectuating means in a certain manner causes one type of element to actuate the releasing means and manipulating the effectuating means in another manner causes another type of element to actuate the releasing means to skip-tabulate the traveling carriage to the proper column.

19. In a machine of the class described, the combination with a traveling carriage, resilient means to impart tabulating movement thereto and escapement means to retain the carriage in tabulated positions; of means to interrupt tabulating movement of the carriage to locate the same in various columnar positions; means to move the interrupting means to effective position and simultaneously disable the escapement means to surrender the carriage to the action of the resilient means; means to retain the interrupting means ineffective irrespective of the moving means; means to effectuate the retaining means; different types of elements on the carriage; and means influenced by the manner in which the effectuating means is manipulated to cause the proper type of element to disengage the retaining means from the interrupting means to skip-tabulate intermediate columns and to locate the carriage in a predetermined column.

20. In a machine of the class described having a laterally shiftable paper carriage, the combination of means to tabulate the carriage from column to column; means to control the tabulating means; elements on the traveling carriage to actuate the controlling means; and manipulative means to move the controlling means into operative alinement with the elements.

21. In a machine of the class described, the combination of a laterally shiftable carriage; columnar stops on the carriage; means cooperating with the stops to control columnar shifting of the carriage; means to move the controlling means into effective position; manually operable means to lock the controlling means in ineffective position; and automatic means to disable the manually operable locking means.

22. In a machine of the class described, the combination of a laterally shiftable carriage; stops located in relation to columnar positions of the carriage; means cooperating with the stops to control columnar spacing of the carriage; a normally ineffective latch; manually operable means to control movement of the latch into position to retain the controlling means ineffective to cause the carriage to tabulate through intermediate columns; and means on the carriage to disable the latch to terminate tabulation of the carriage in the desired column.

23. In a machine of the class described, the combination of a laterally shiftable carriage; resilient means to advance the carriage from one columnar position to another; stops on the carriage; means cooperating with the stops to control columnar movement of the traveling carriage; means to operate said controlling means for said purpose; a manipulative member; and means rendered effective by the manipulative member to govern operation of said controlling means to effect movement of the carriage directly from one columnar position to a predetermined columnar position without stopping at intermediate columnar positions.

24. In a machine of the class described, the combination of a laterally shiftable carriage; resilient means to advance the carriage from one columnar position to another; escapement means to restrain advancing movement of the carriage; stops on the carriage; means cooperating with the stops to control columnar movement of the carriage; means to operate the controlling means to advance the traveling carriage, said means also adapted to simultaneously disable the escapement means; and means to govern operation of said controlling means to move the carriage from one columnar position to a predetermined columnar position without stopping at intermediate columnar positions.

25. In a machine of the class described, the combination of a laterally shiftable carriage; means to return the carriage in one direction; a rack shiftably mounted on the carriage; a clutch operatively connecting the returning means to the rack, said rack when it is shifted on the carriage being cooperable with the clutch to disengage the same; members on the carriage located in columnar positions thereof; and means cooperating with the members to cause the rack to shift to disconnect the clutch in different columnar positions of the carriage.

26. In a machine of the class described, the combination of a laterally shiftable traveling carriage; means to return the carriage; a rack shiftably mounted on the carriage; a clutch operatively connecting the returning means to the rack; means on the clutch engageable by the rack when it is shifted whereby the shifting of the rack disengages the clutch; a variety of members located on the carriage in corresponding columnar positions thereof; a variable element adapted to cooperate with the members; and means to move the element into cooperative alinement with the different members to obstruct return movement of the carriage to cause the rack to shift to disconnect the clutch in predetermined columnar positions of the carriage.

27. In a machine of the class described, the combination of a laterally shiftable carriage; means to return the carriage; a clutch operatively connecting the returning means to the carriage; a variety of members located in columnar positions on the carriage; an element adapted to be located in various positions to cooperate with the different members to disconnect the clutch in various columnar positions; a plurality of means manipulation of any one of which is adapted to control positioning of the element and simultaneously effectuate the clutch mechanism; means to restore the element to ineffective position in the first part of a machine operation; and means to lock all the controlling means inoperative during the first part of machine operation to prevent returning the carriage while the impression is being made.

28. In a traveling carriage return mechanism, the combination of a prime-mover; a clutch operatively connecting the prime-mover to the carriage; members located in columnar positions on the carriage; an element cooperating with the members to terminate return movement of the carriage; and means, including a rack shiftably mounted on the carriage, effectuated by termination of the return movement of the carriage to disconnect the clutch.

29. In a machine of the class described, the combination of a shiftable carriage; means to return the carriage in one direction; a clutch operatively connecting the returning means to the carriage; members located in columnar positions on the carriage; an element cooperating with the members to interrupt the return movement of the carriage; manipulative means to control the elements and simultaneously engage the clutch; and means, including a shiftable rack mounted on the carriage, effectuated by interruption of the return movement of the carriage to disengage the clutch.

30. In a machine of the class described, the combination of a shiftable carriage; means to return the carriage in one direction; a clutch device operatively connecting the returning means to the carriage; a variety of members located in columnar positions on the traveling carriage; an element cooperating with the different members to terminate return movement of the carriage in the desired columnar position; means to restore the element to normal position during the first part of a machine operation; a plurality of manipulative means to selectively move the element into the path of the desired member and simultaneously engage the clutch device; means to lock the moving means inoperative during the first part of a machine operation to prevent return of the carriage while the impression is being taken; a shiftable rack mounted on the carriage; and means whereby terminating return movement of the carriage causes the rack to shift to disengage the clutch device.

31. In a machine of the class described, the combination of a laterally shiftable carriage; means to return the traveling carriage; a shiftable rack mounted on the carriage; a clutch driven by the returning means and comprising clutch members, one of which is operatively connected to the rack and is adapted to be moved into and out of clutching position; means to selectively terminate return movement of the carriage to locate the same in predetermined columnar positions; and means whereby termination of the return movement of the carriage causes the rack to shift to move the one clutch member out of clutching position.

32. In a machine of the class described, the combination of a laterally shiftable carriage; means to return the carriage; a clutch including a driving member operated by the returning means and a driven member; means manipulation of which is adapted to engage the clutch members and simultaneously move an obstruction in the path of the carriage; and means on the carriage effective when return movement thereof is obstructed to disengage the clutch members.

33. In a machine of the class described, the combination of a laterally shiftable carriage; means to return the carriage; means to obstruct return movement of the carriage; a clutch operatively connecting the returning means to the carriage; and means on the carriage adapted to move relatively thereto when return movement of said carriage is obstructed to disengage the clutch.

34. In a machine of the class described, the combination of a laterally shiftable carriage; means to return the carriage; a return rack non-rigidly supported by the carriage; a clutch driving member operated by the returning means; a clutch driven member operatively connected to the rack; and means to obstruct return movement of the carriage to cause the rack to continue movement independently thereof to move the clutch driven member out of clutching position.

35. In a machine of the class described, the combination of a laterally shiftable carriage; means to return the carriage in one direction; a return rack loosely mounted on the carriage; a clutch driving member operated by the returning means; a clutch driven member cooperating with the rack; a plurality of blocks on the carriage adjustable to different columnar positions; and means cooperating with the blocks to terminate return movement of the carriage to cause the rack to continue movement independently thereof to disengage the clutch driven member from the clutch driving member.

36. In a machine of the class described, having a laterally shiftable carriage, the combination of means to return the carriage in one direction; a return rack loosely mounted on the carriage; a clutch driving member operated by the returning means; a clutch driven member constantly meshed with the rack; a plurality of blocks on the carriage adjustable to different columnar positions; means cooperating with the blocks to interrupt return movement of the carriage to cause the rack to continue movement independently thereof to disengage the clutch driven member from the clutch driving member; resilient means to return the rack upon completion of its independent movement; and means to move the cooperating means into the path of the blocks and simultaneously engage the clutch members.

37. In a machine of the class described, the combination of a laterally shiftable carriage; a platen roll carried thereby; means to rotate the platen roll; means connecting the rotating means to the platen roll; means to tabulate the traveling carriage; means to release the machine for operation; means governed by the releasing means to control the connecting and the tabulating means; and means to render the controlling means ineffective irrespective of the releasing means.

38. In a machine of the class described, the combination of a laterally shiftable paper carriage; a platen roll supported thereby; means to rotate the platen; means including a shiftable member connecting the rotating means to the platen; means to tabulate the carriage to various columnar positions; means on the platen rotating means to effectuate the tabulating means; means to release the machine for operation; means governed by the releasing means to control the shiftable member and the effectuating means; and means to render the controlling means ineffective irrespective of the releasing means.

39. In a machine of the class described, the combination of a laterally shiftable carriage; means to tabulate the carriage to various columns; means to operate the tabulating means; means to control the operating means; and means including a member with a plurality of positions to allow the controlling means to move to effective position or to retain said controlling means ineffective.

40. In a machine of the class described having a laterally shiftable carriage, the combination of means to tabulate the carriage to various columns; means to operate the tabulating means; means including a spring-pulled lever to enable the operating means; and means including a positionable plate with a plurality of recesses adapted to cooperate with the lever to retain the same ineffective or to allow said lever to move to effective position.

41. In a machine of the class described having a laterally shiftable carriage supporting a platen roll, the combination of means to tabulate the carriage to various columns; means to rotate the platen; means normally effective to connect the rotating means to the platen; means to render the connecting means ineffective; means dependent upon the rendering means to govern the tabulating means; and a selective element to control the rendering and the governing means.

42. In a machine of the class described having printing means and a laterally shiftable carriage, the combination of means to tabulate the carriage to various columnar positions; means to effectuate the tabulating means; means to disable the printing means; a member to control the effectuating and the disabling means; and selective means to operate the member.

43. In a machine of the class described having printing means and a laterally shiftable carriage, the combination of means to tabulate the carriage to various columnar positions; means to effectuate the tabulating means; means to disable the printing means; a member adapted to be moved in one direction to operate the disabling means and in another direction to operate the effectuating means; and a positionable element to control the members.

44. In a machine of the class described, having a laterally shiftable carriage; the combination of means to tabulate the carriage to various columns; means to release the machine for operation; a member controlled by the releasing means; an element adapted to effectuate the tabulating means, said element depending upon the member for effectiveness; and selective means to control the elements and to further control the members which control by means of the element is transmitted to the tabulating means.

45. In a machine of the class described having printing means and a laterally shiftable carriage, the combination of means to tabulate the carriage to various columns; a member adapted to be moved in one direction to disable the printing means and in another direction to effectuate the tabulating means; means to release the machine for operation; an element under control of the releasing means, said element governing the movement of the member to effectuate the tabulating means; positionable means to move the member to disable the printing means and to control movement of the member and the element irrespective of the releasing means to govern the tabulating means.

46. In a machine of the class described having printing means and a laterally shiftable carriage supporting a platen roll, the combination of means to tabulate the carriage to various columnar positions; means to rotate the platen roll; means connecting the rotating means to the platen roll; a member adapted to be moved in one direction to disable the printing means and in another direction to effectuate the tabulating means; means to release the machine for operation; an element under control of the releasing means to control the connecting means and to govern the member in its movement to effectuate the tabulating means; a positionable means to move the member to disable the printing means and to control the member and the element in their movements to govern respectively the tabulating and connecting means irrespective of the releasing means.

47. In a machine of the class described having a traveling carriage supporting a platen roll, the combination of means to feed the platen roll; means to operate the feeding means; means to connect the feeding means to the operating means; means effective upon machine operation to move the connecting means to ineffective position to prevent feeding of the platen roll; means to tabulate the traveling carriage; means to return the traveling carriage from tabulated positions to a predetermined columnar position; and means operated by the returning means to set the machine in motion and simultaneously retain the moving means inoperative to render the connecting means effective to cause the platen roll to be line-spaced.

48. In a calculating machine having a traveling carriage supporting a platen roll, the combination of means to automatically tabulate the traveling carriage to different columnar positions; means to feed the platen roll; means to release the machine for operation; means rendered effective by the releasing means to enable the tabulating means and simultaneously disable the feeding means; a second machine releasing means; and means rendered effective by the second releasing means to retain the enabling means and disabling means inoperative to prevent functioning of the automatic tabulating mechanism and to permit functioning of the platen roll feeding means.

49. In a machine of the character described, having a traveling carriage supporting a platen roll, the combination of means to automatically tabulate the traveling carriage to different columnar positions, said means being normally ineffective; means to feed the platen roll, said feeding means being normally effective; two manipulative devices, operation of either of which is adapted to set the machine in motion; a contrivance rendered effective by operation of one of the manipulative devices to render the tabulating means effective and to simultaneously render the platen roll feeding means ineffective; and means rendered effective by operation of the other manipulative device to retain the contrivance inoperative to prevent the automatic tabulating mechanism from functioning and to permit the platen roll feeding means to function.

50. In a machine of the class described having a traveling carriage, the combination of means including a normally ineffective stop plunger to locate the carriage in tabulated positions; a manipulative member; means rendered effective by the manipulative member to retain the stop plunger in ineffective position to cause the carriage to skip intermediate columns; and means whereby manipulating the member in a certain manner renders the retaining means ineffective to skip tabulate the carriage to a certain column and manipulating the member in another manner renders the retaining means ineffective to skip tabulate the carriage to another column.

51. In a machine of the class described having a traveling carriage, the combination of a manipulative device; means rendered effective by the manipulative device to cause the carriage to skip tabulate through intermediate columns; and means whereby manipulating the device in a certain manner causes tabulation of the carriage to be terminated in a certain columnar position, and manipulating the device in another manner causes tabulation of the carriage to be terminated in another columnar position.

52. In a machine of the class described having a traveling carriage, the combination of a manipulative device; means rendered effective by the manipulative device to cause the carriage to skip tabulate through intermediate columns; different tyes of elements located in columnar positions on the carriage to terminate tabulation thereof in the desired column; and means rendered effective when the device is manipulated in a certain manner to effectuate a certain type of element to terminate tabulation of the carriage in a certain columnar position, said means also adapted to effectuate another type of element to terminate tabulation of the carriage in another columnar position when the device is manipulated in another manner.

RAYMOND A. CHRISTIAN.